(12) United States Patent
Amitai

(10) Patent No.: US 11,099,389 B2
(45) Date of Patent: Aug. 24, 2021

(54) SUBSTRATE-GUIDE OPTICAL DEVICE

(71) Applicant: LUMUS LTD., Ness Ziona (IL)

(72) Inventor: Yaakov Amitai, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 157 days.

(21) Appl. No.: 16/429,073

(22) Filed: Jun. 3, 2019

(65) Prior Publication Data

US 2019/0361241 A1 Nov. 28, 2019

Related U.S. Application Data

(60) Continuation of application No. 15/984,461, filed on May 21, 2018, now Pat. No. 10,732,415, which is a (Continued)

(30) Foreign Application Priority Data

Feb. 10, 2005 (IL) .......................................... 166799

(51) Int. Cl.
*G02B 27/10* (2006.01)
*G02B 6/10* (2006.01)
(Continued)

(52) U.S. Cl.
CPC ...... *G02B 27/0172* (2013.01); *B29D 11/0073* (2013.01); *G02B 6/003* (2013.01);
(Continued)

(58) Field of Classification Search
None
See application file for complete search history.

(56) References Cited

U.S. PATENT DOCUMENTS

| 3,737,212 A | 6/1973 | Antonson et al. |
| 3,807,849 A | 4/1974 | Lobb |

(Continued)

FOREIGN PATENT DOCUMENTS

| DE | 1422172 | 11/1970 |
| DE | 19725262 | 12/1998 |

(Continued)

OTHER PUBLICATIONS

Jan van de Kraats et al. "Directional and nondirectional spectral reflection from the human fovea" journal of biomedical optics 13(2), 024010 Mar./ Apr. 2008.

*Primary Examiner* — Derek S. Chapel
(74) *Attorney, Agent, or Firm* — Mark M. Friedman

(57) ABSTRACT

A method fabricates an optical device that includes at least one partially reflecting surface and a light-wave transmitting substrate is fabricated. A plurality of transparent plates is obtained. At least one surface of at least one of the transparent plates is coated with a partially reflecting coating to form the at least one partially reflecting surface. The plates are arranged in a stack and attached to each other. The plates at the opposing ends of the stack are thicker than the remaining plates in the stack. The stack is sliced to form the substrate such that the substrate has two major external surfaces. The substrate is grinded or polished, and at least one of the two major external surfaces is coated with a coating that compensates for non-uniformity of the substrate.

14 Claims, 17 Drawing Sheets

Related U.S. Application Data continuation of application No. 15/051,323, filed on Feb. 23, 2016, now Pat. No. 9,977,244, which is a continuation of application No. 13/852,151, filed on Mar. 28, 2013, now abandoned, which is a division of application No. 11/815,541, filed as application No. PCT/IL2006/000156 on Feb. 8, 2006, now Pat. No. 8,432,614.

(51) Int. Cl.

| | | |
|---|---|---|
| *G02B 27/28* | (2006.01) | |
| *G02B 27/14* | (2006.01) | |
| *G02B 27/01* | (2006.01) | |
| *F21V 8/00* | (2006.01) | |
| *G02B 27/00* | (2006.01) | |
| *B29D 11/00* | (2006.01) | |
| *G02C 11/00* | (2006.01) | |
| *G02B 5/30* | (2006.01) | |
| *G02B 6/00* | (2006.01) | |

(52) U.S. Cl.
CPC ......... *G02B 6/0031* (2013.01); *G02B 6/0055* (2013.01); *G02B 6/0056* (2013.01); *G02B 6/105* (2013.01); *G02B 27/0081* (2013.01); *G02B 27/0176* (2013.01); *G02B 27/1066* (2013.01); *G02B 27/1073* (2013.01); *G02B 27/14* (2013.01); *G02B 27/144* (2013.01); *G02B 27/145* (2013.01); *G02B 27/283* (2013.01); *G02C 11/10* (2013.01); *G02B 5/30* (2013.01); *G02B 6/00* (2013.01); *G02B 2027/015* (2013.01); *G02B 2027/0118* (2013.01); *G02B 2027/0125* (2013.01); *G02B 2027/0132* (2013.01); *G02B 2027/0134* (2013.01); *G02B 2027/0136* (2013.01); *G02B 2027/0138* (2013.01); *G02B 2027/0178* (2013.01)

(56) References Cited

U.S. PATENT DOCUMENTS

| | | |
|---|---|---|
| 3,940,204 A | 2/1976 | Withrington |
| 4,084,883 A | 4/1978 | Eastman et al. |
| 4,309,070 A | 1/1982 | St. Leger Searle |
| 4,516,828 A | 5/1985 | Steele |
| 4,613,216 A | 9/1986 | Herbec et al. |
| 4,711,512 A | 12/1987 | Upatnieks |
| 4,775,217 A | 10/1988 | Ellis |
| 4,798,448 A | 1/1989 | Van Raalte |
| 4,805,988 A | 2/1989 | Dones |
| 5,076,664 A | 12/1991 | Migozzi |
| 5,096,520 A | 3/1992 | Faris |
| 5,231,642 A | 7/1993 | Scifres et al. |
| 5,301,067 A | 4/1994 | Bleier et al. |
| 5,353,134 A | 10/1994 | Michel et al. |
| 5,369,415 A | 11/1994 | Richard et al. |
| 5,430,505 A | 7/1995 | Katz |
| 5,453,877 A | 9/1995 | Gerbe et al. |
| 5,543,877 A | 8/1996 | Takashi et al. |
| 5,619,601 A | 4/1997 | Akashi et al. |
| 5,724,163 A | 3/1998 | David |
| 5,896,232 A | 4/1999 | Budd et al. |
| 5,966,223 A | 10/1999 | Amitai et al. |
| 5,982,536 A | 11/1999 | Swan |
| 6,052,500 A | 4/2000 | Takano et al. |
| 6,091,548 A | 7/2000 | Chen |
| 6,144,347 A | 11/2000 | Mizoguchi et al. |
| 6,154,321 A | 11/2000 | Melville et al. |
| 6,222,676 B1 | 4/2001 | Togino et al. |
| 6,324,330 B1 | 11/2001 | Stites |
| 6,349,001 B1 | 2/2002 | Spitzer |
| 6,384,982 B1 | 5/2002 | Spitzer |
| 6,388,814 B2 | 5/2002 | Tanaka |
| 6,404,550 B1 * | 6/2002 | Yajima ................ G02B 27/283 348/E5.141 |
| 6,404,947 B1 | 6/2002 | Matsuda |
| 6,421,031 B1 | 7/2002 | Ronzani et al. |
| 6,480,174 B1 | 11/2002 | Kaufmann et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,926,429 B2 | 8/2005 | Barlow et al. |
| 7,016,113 B2 | 3/2006 | Choi et al. |
| 7,199,934 B2 | 4/2007 | Yamasaki |
| 7,205,960 B2 | 4/2007 | David |
| 7,245,273 B2 | 7/2007 | Eberl et al. |
| 7,307,791 B2 | 12/2007 | Li et al. |
| 7,355,795 B1 | 4/2008 | Yamazaki et al. |
| 7,430,355 B2 | 9/2008 | Heikenfeld et al. |
| 7,643,214 B2 | 1/2010 | Amitai |
| 7,667,962 B2 | 2/2010 | Mullen |
| 7,751,122 B2 | 7/2010 | Amitai |
| 7,777,960 B2 | 8/2010 | Freeman |
| 8,004,765 B2 | 8/2011 | Amitai |
| 8,098,439 B2 | 1/2012 | Amitai et al. |
| 8,405,573 B2 | 3/2013 | Lapidot et al. |
| 8,467,133 B2 | 6/2013 | Miller |
| 8,611,015 B2 | 12/2013 | Wheeler et al. |
| 8,913,865 B1 | 12/2014 | Bennett |
| 8,917,453 B2 | 12/2014 | Bohn |
| 8,998,414 B2 | 4/2015 | Bohn |
| 9,513,481 B2 | 12/2016 | Amitai |
| 9,551,874 B2 | 1/2017 | Amitai |
| 9,551,880 B2 | 1/2017 | Amitai |
| 9,910,283 B2 | 3/2018 | Amitai |
| 9,977,244 B2 | 5/2018 | Amitai |
| 10,209,517 B2 | 2/2019 | Popovich et al. |
| 2002/0015233 A1 | 2/2002 | Park |
| 2002/0191297 A1 | 12/2002 | Gleckman et al. |
| 2003/0020006 A1 | 1/2003 | Janeczko et al. |
| 2003/0063042 A1 | 4/2003 | Friesem et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0137189 A1 | 7/2004 | Tellini et al. |
| 2005/0018308 A1 | 1/2005 | Cassarly et al. |
| 2005/0084210 A1 | 4/2005 | Cha |
| 2005/0174658 A1 | 8/2005 | Long et al. |
| 2005/0180687 A1 | 8/2005 | Amitai et al. |
| 2005/0248852 A1 | 11/2005 | Yamasaki |
| 2006/0052146 A1 | 3/2006 | Ou |
| 2006/0061555 A1 | 3/2006 | Mullen |
| 2006/0103590 A1 | 5/2006 | Divon |
| 2007/0070859 A1 | 3/2007 | Hirayama |
| 2007/0285663 A1 | 12/2007 | Hewitt et al. |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0171680 A1 | 7/2010 | Lapidot et al. |
| 2010/0201953 A1 | 8/2010 | Freeman et al. |
| 2010/0278480 A1 | 11/2010 | Vasylyev et al. |
| 2010/0291489 A1 | 11/2010 | Moskovits et al. |
| 2010/0302276 A1 | 12/2010 | Levola |
| 2011/0109880 A1 | 5/2011 | Vnummela |
| 2012/0179369 A1 | 7/2012 | Lapidot et al. |

(56) References Cited

U.S. PATENT DOCUMENTS

| | | |
|---|---|---|
| 2012/0194781 A1 | 8/2012 | Agurok |
| 2013/0208362 A1 | 8/2013 | Bohn et al. |
| 2013/0229717 A1 | 9/2013 | Amitai |
| 2013/0257832 A1 | 10/2013 | Hammond |
| 2013/0276960 A1 | 10/2013 | Amitai |
| 2013/0279017 A1 | 10/2013 | Amitai |
| 2013/0334504 A1 | 12/2013 | Thompson et al. |
| 2014/0003762 A1 | 1/2014 | Macnamara |
| 2014/0019801 A1 | 1/2014 | Sutton et al. |
| 2014/0118313 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0140654 A1 | 5/2014 | Brown et al. |
| 2014/0240834 A1 | 8/2014 | Mason |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0182748 A1 | 7/2015 | Gefen et al. |
| 2015/0185475 A1 | 7/2015 | Saarikko et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0277127 A1 | 10/2015 | Amitai |
| 2015/0289762 A1 | 10/2015 | Popovich et al. |
| 2015/0293360 A1 | 10/2015 | Amitai |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0189432 A1 | 6/2016 | Bar-Zeev et al. |
| 2016/0209648 A1 | 7/2016 | Haddick et al. |
| 2016/0209657 A1 | 7/2016 | Popovich et al. |
| 2016/0266387 A1 | 9/2016 | Tekolste et al. |
| 2016/0341964 A1 | 11/2016 | Amitai |
| 2016/0349518 A1 | 12/2016 | Amitai et al. |
| 2017/0011555 A1 | 1/2017 | Li et al. |
| 2017/0017095 A1 | 1/2017 | Fricker et al. |
| 2017/0045744 A1 | 2/2017 | Amitai |
| 2017/0052376 A1 | 2/2017 | Amitai |
| 2017/0052377 A1 | 2/2017 | Amitai |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0120559 A1 | 5/2018 | Yeoh et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0293856 A1 | 9/2019 | Danziger |
| 2019/0339530 A1 | 11/2019 | Amitai |
| 2019/0361240 A1 | 11/2019 | Gelberg |
| 2019/0361241 A1 | 11/2019 | Lurnus Ltd |
| 2019/0377187 A1 | 12/2019 | Rubin et al. |
| 2019/0391408 A1 | 12/2019 | Mansharof |
| 2020/0192089 A1 | 6/2020 | Haddick et al. |

FOREIGN PATENT DOCUMENTS

| | | |
|---|---|---|
| DE | 102013106392 | 12/2014 |
| EP | 0365406 | 4/1990 |
| EP | 0360035 | 8/1990 |
| EP | 0399865 | 11/1990 |
| EP | 0543718 | 5/1993 |
| EP | 0586004 | 10/1993 |
| EP | 1158336 | 11/2001 |
| EP | 1326102 | 7/2003 |
| EP | 1385023 | 1/2004 |
| EP | 1485747 | 12/2004 |
| EP | 1562066 | 8/2005 |
| EP | 1691547 | 8/2006 |
| EP | 0770818 | 4/2007 |
| EP | 1779159 | 5/2007 |
| EP | 1180711 | 2/2020 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| IL | 183637 | 6/2013 |
| JP | 1996313843 | 11/1996 |
| JP | 2002350771 | 12/2002 |
| JP | 2002368762 | 12/2002 |
| JP | 2004233909 | 8/2004 |
| JP | 2012-037761 U | 2/2012 |
| WO | 9510106 | 4/1995 |
| WO | 9815868 | 4/1998 |
| WO | 9952002 | 10/1999 |
| WO | 0004407 | 1/2000 |
| WO | 0063738 | 10/2000 |
| WO | 0195025 | 12/2001 |
| WO | 0195027 | 12/2001 |
| WO | 2082168 | 10/2002 |
| WO | 03058320 | 7/2003 |
| WO | 03081320 | 10/2003 |
| WO | 2004109349 | 12/2004 |
| WO | 2008023367 | 2/2008 |
| WO | 2012008966 | 1/2012 |
| WO | 2013065656 | 5/2013 |
| WO | 2013112705 | 8/2013 |
| WO | 2015081313 | 6/2015 |
| WO | 2016103251 | 6/2016 |
| WO | 2016103251 A1 | 6/2016 |
| WO | WO2015012280 | 3/2017 |

* cited by examiner

SUBSTRATE-GUIDE OPTICAL DEVICE

FIELD OF THE INVENTION

The present invention relates to substrate-guided optical devices, and particularly to devices which include a plurality of anisotropic reflecting surfaces carried by a light-transmissive substrate, also referred to as a light wave-guide optical element (LOE).

The invention can be implemented to advantage in a large number of imaging applications, such as, for example, head-mounted and head-up displays, cellular phones, compact displays, 3-D displays, compact beam expanders as well as non-imaging applications such as flat-panel indicators, compact illuminators and scanners.

BACKGROUND OF THE INVENTION

One of the important applications for compact optical elements is in head-mounted displays wherein an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. Unfortunately, as the desired field-of-view (FOV) of the system increases, such a conventional optical module becomes larger, heavier, bulkier and therefore, even for a moderate performance device, impractical. This is a major drawback for all kinds of displays but especially in head-mounted applications, wherein the system must necessarily be as light and as compact as possible.

The strive for compactness has led to several different complex optical solutions, all of which, on one hand, are still not sufficiently compact for most practical applications, and, on the other hand, suffer major drawbacks in terms of manufacturability. Furthermore, the eye-motion-box of the optical viewing angles resulting from these designs is usually very small—typically less than 8 mm. Hence, the performance of the optical system is very sensitive, even to small movements of the optical system relative to the eye of the viewer, and do not allow sufficient pupil motion for conveniently reading text from such displays.

SUMMARY OF THE INVENTION

The present invention facilitates the design and fabrication of very compact LOEs for, amongst other applications, head-mounted displays. The invention allows relatively wide FOV's together with relatively large eye-motion-box values. The resulting optical system offers a large, high-quality image, which also accommodates large movements of the eye. The optical system offered by the present invention is particularly advantageous because it is substantially more compact than state-of-the art implementations and yet it can be readily incorporated, even into optical systems having specialized configurations.

The invention also enables the construction of improved head-up displays (HUDs). Since the inception of such displays more than three decades ago, there has been significant progress in the field. Indeed, HUDs have become popular and they now play an important role, not only in most modern combat aircraft, but also in civilian aircraft, in which HUD systems have become a key component for low visibility landing operation. Furthermore, there have recently been numerous proposals and designs for HUDs in automotive applications where they can potentially assist the driver in driving and navigation tasks. Nevertheless, state-of-the-art HUDs suffer several significant drawbacks. All HUDs of the current designs require a display source that must be offset a significant distance from the combiner to ensure that the source illuminates the entire combiner surface. As a result, the combiner-projector HUD system is necessarily bulky, and large, and requires considerable installation space, which makes it inconvenient for installation and at times even unsafe to use. The large optical aperture of conventional HUDs also poses a significant optical design challenge, either rendering the HUDs with compromising performance, or leading to high cost wherever high-performance is required. The chromatic dispersion of high-quality holographic HUDs is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can be readily installed in a variety of configurations for a wide range of applications. In addition, the chromatic dispersion of. the display is negligible and, as such, can operate with wide spectral sources, including a conventional white-light source. In addition, the present invention expands the image so that the active area of the combiner can be much larger than the area that is actually illuminated by the light source.

A further application of the present invention is to provide a compact display with a wide FOV for mobile, hand-held application such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically very compact display with a very large virtual image. This is a key feature in mobile communications, and especially for mobile internet access, solving one of the main limitations for its practical implementation. Thereby the present invention enables the viewing of the digital content of a full format internet page within a small, hand-held device, such as a cellular phone.

A broad object of the present invention is therefore to ameliorate the drawbacks of state-of-the-art compact optical display devices and to provide other optical components and systems having improved performance, according to specific requirements.

In accordance with the present invention there is provided an optical device, comprising a light waves-transmitting substrate having at least two major surfaces and edges, optical means for coupling light waves into said substrate by total internal reflection, and a plurality of partially reflecting surfaces carried by said substrate wherein said partially reflecting surfaces are parallel to each other and are not parallel to any of the edges of said substrate, characterized in that at least one of said partially reflecting surfaces is an anisotropic surface.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

Figure 1:
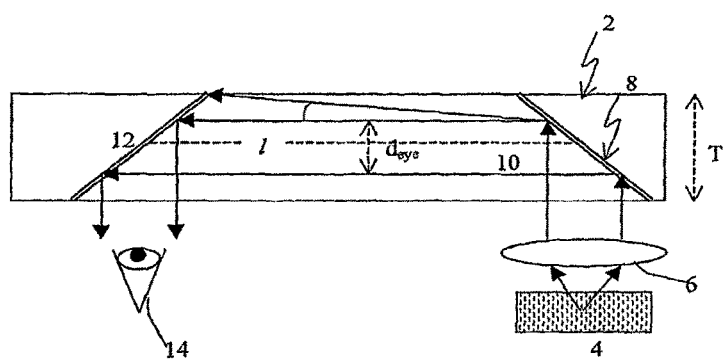
Figure 2:
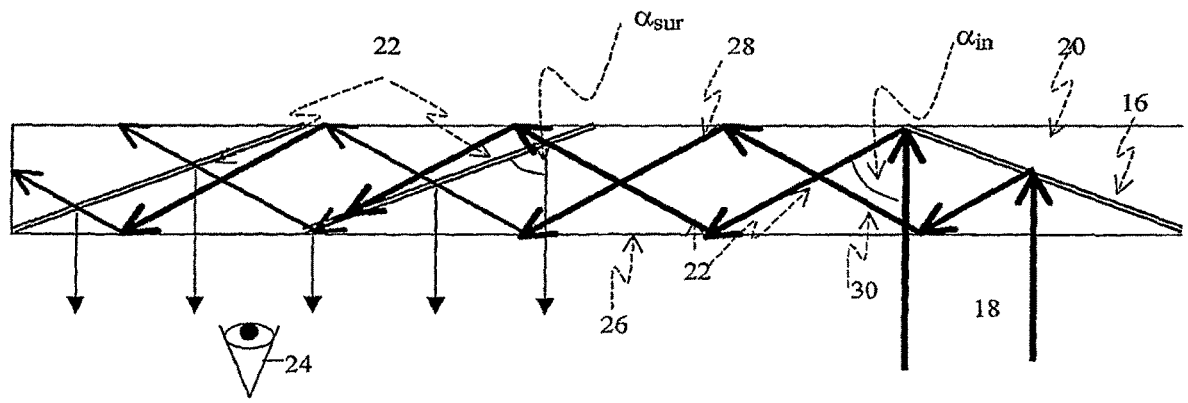
Figure 3A:
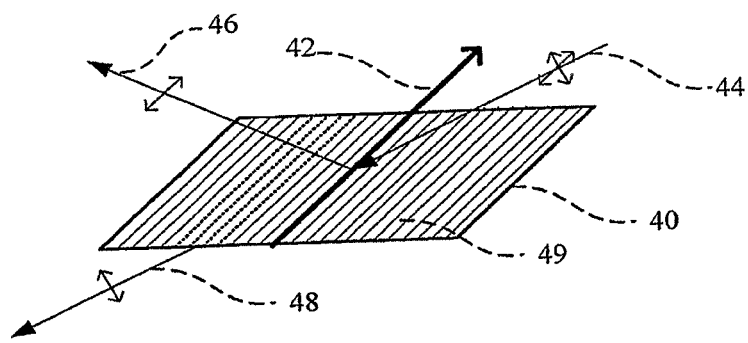
Figure 3B:
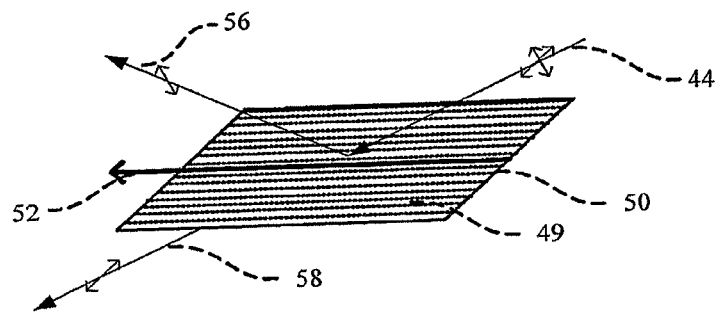
Figure 4:
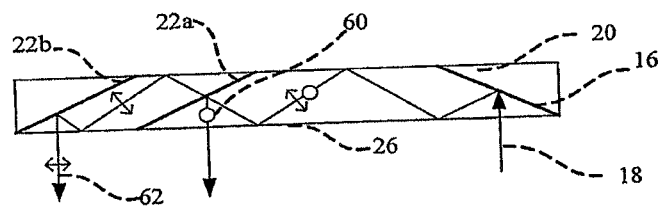
Figure 5:
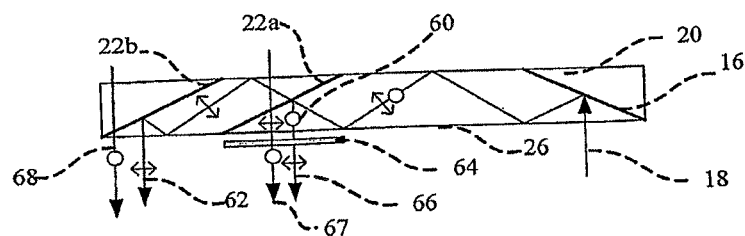
Figure 6:
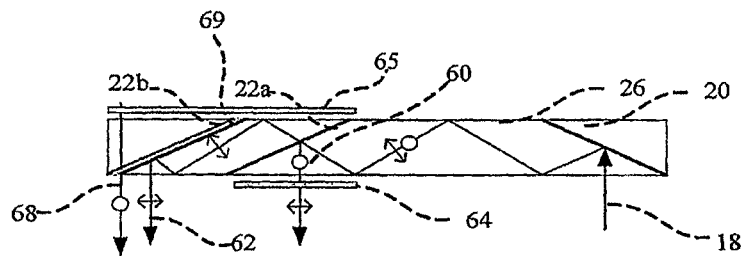
Figure 7:
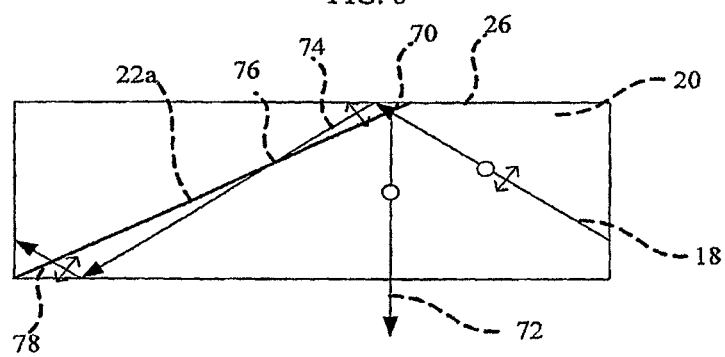
Figure 8:
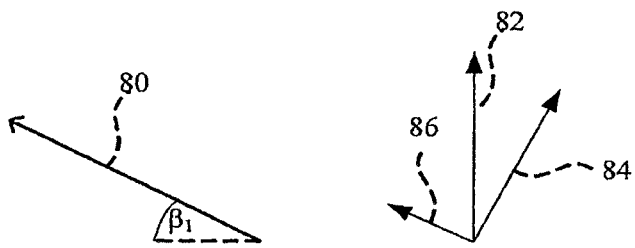
Figure 9:
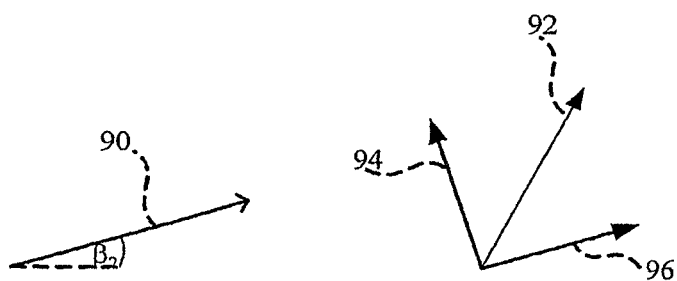
Figure 10:
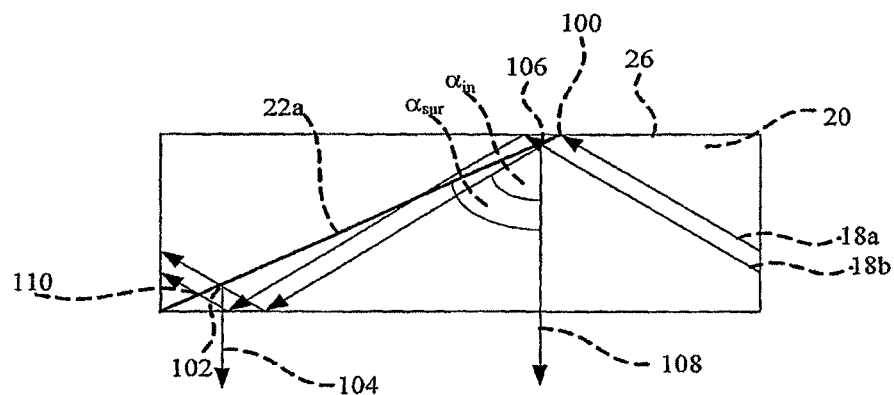
Figure 11:
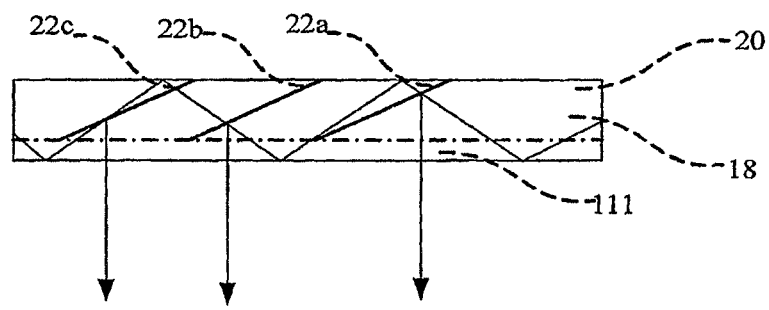
Figure 12:
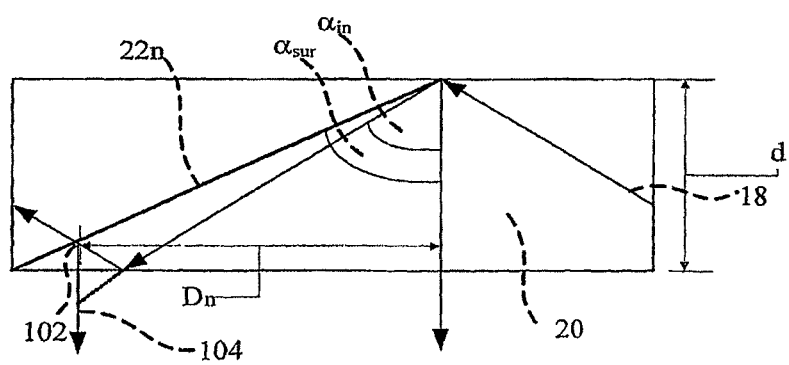
Figure 13:
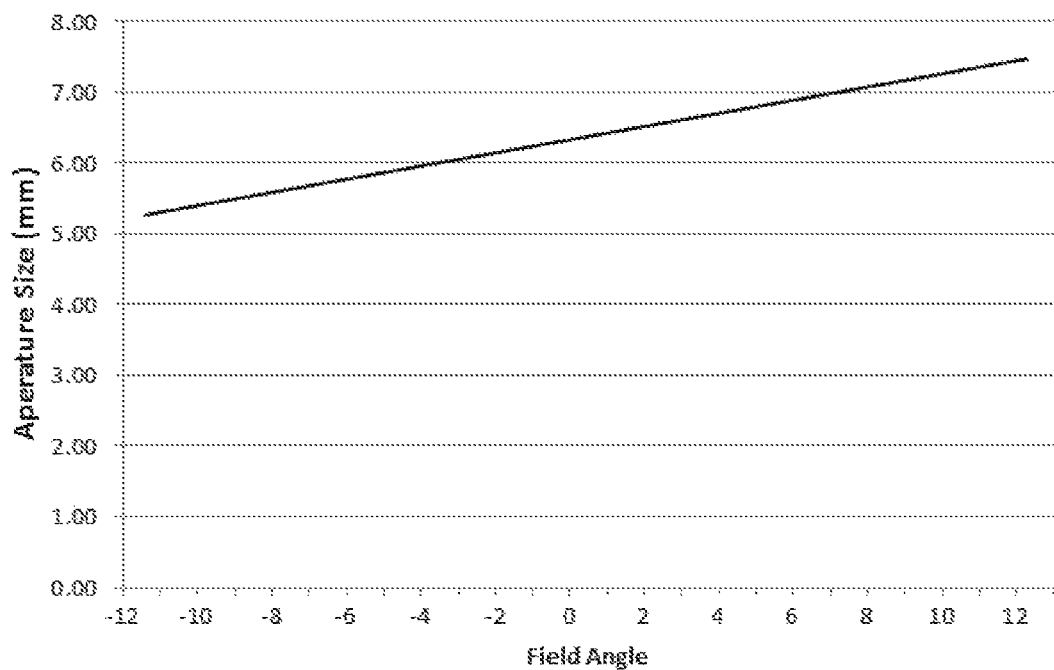
Figure 14:
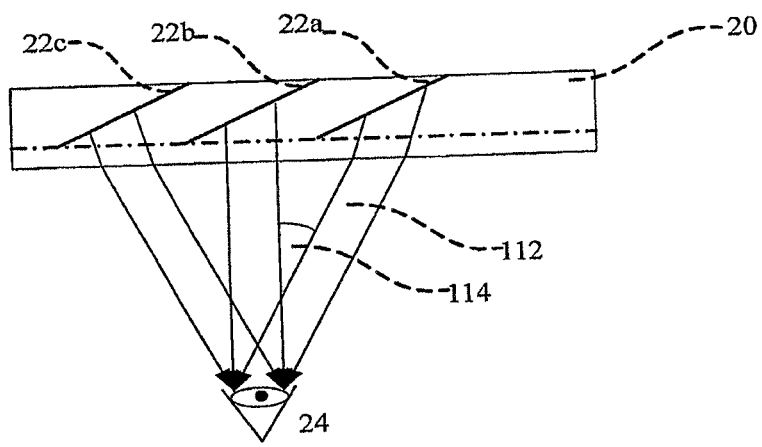
Figure 15:
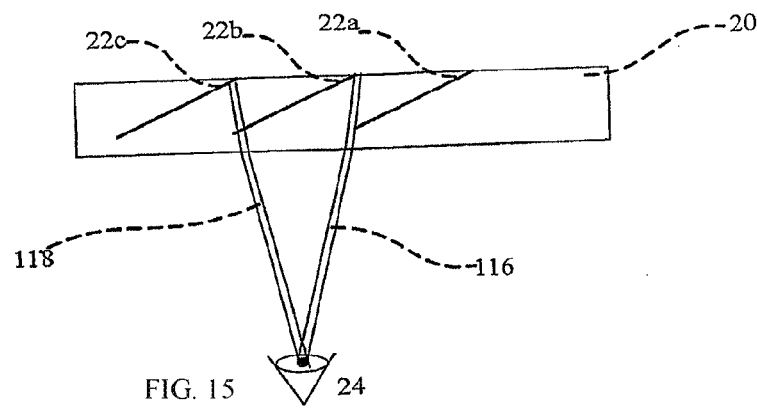
Figure 16:
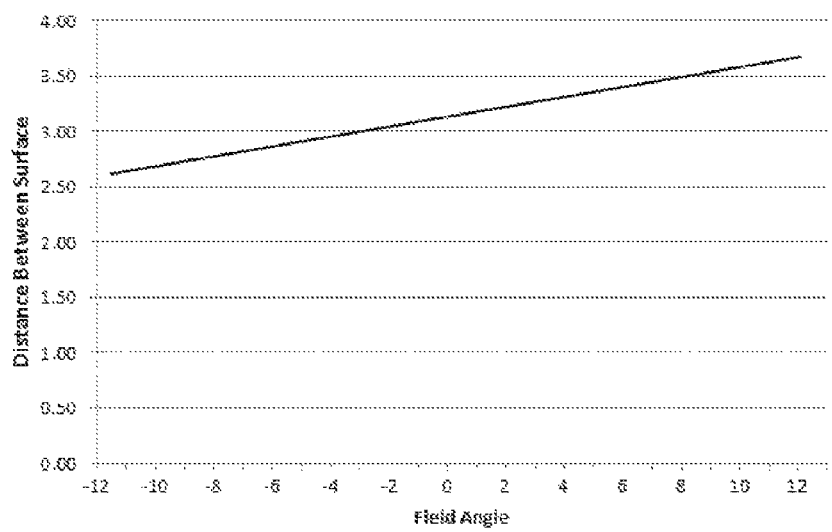
Figure 17:
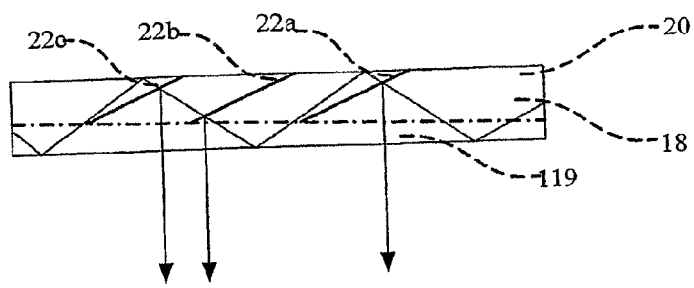
Figure 18:
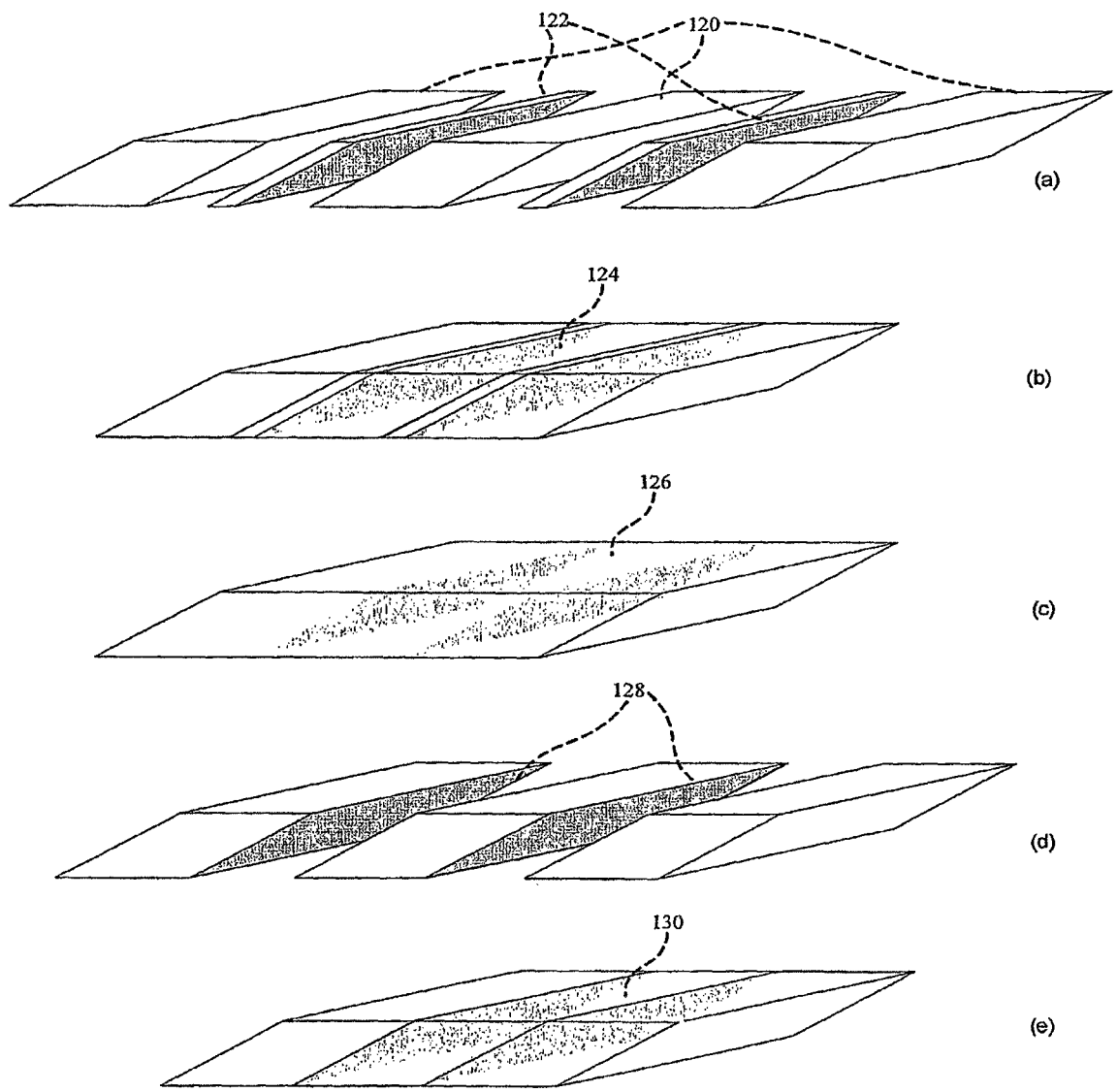
Figure 19:
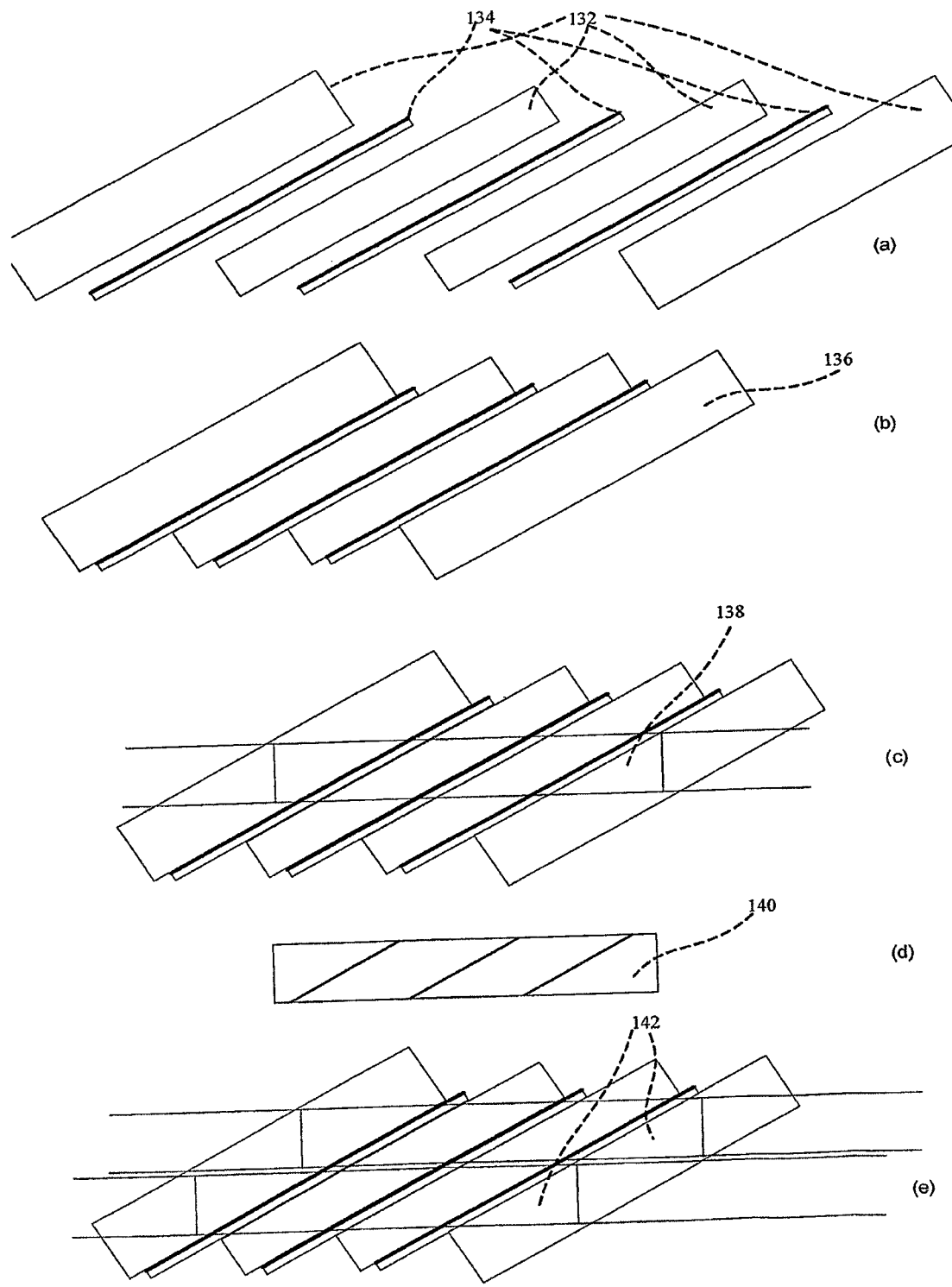
Figure 20:
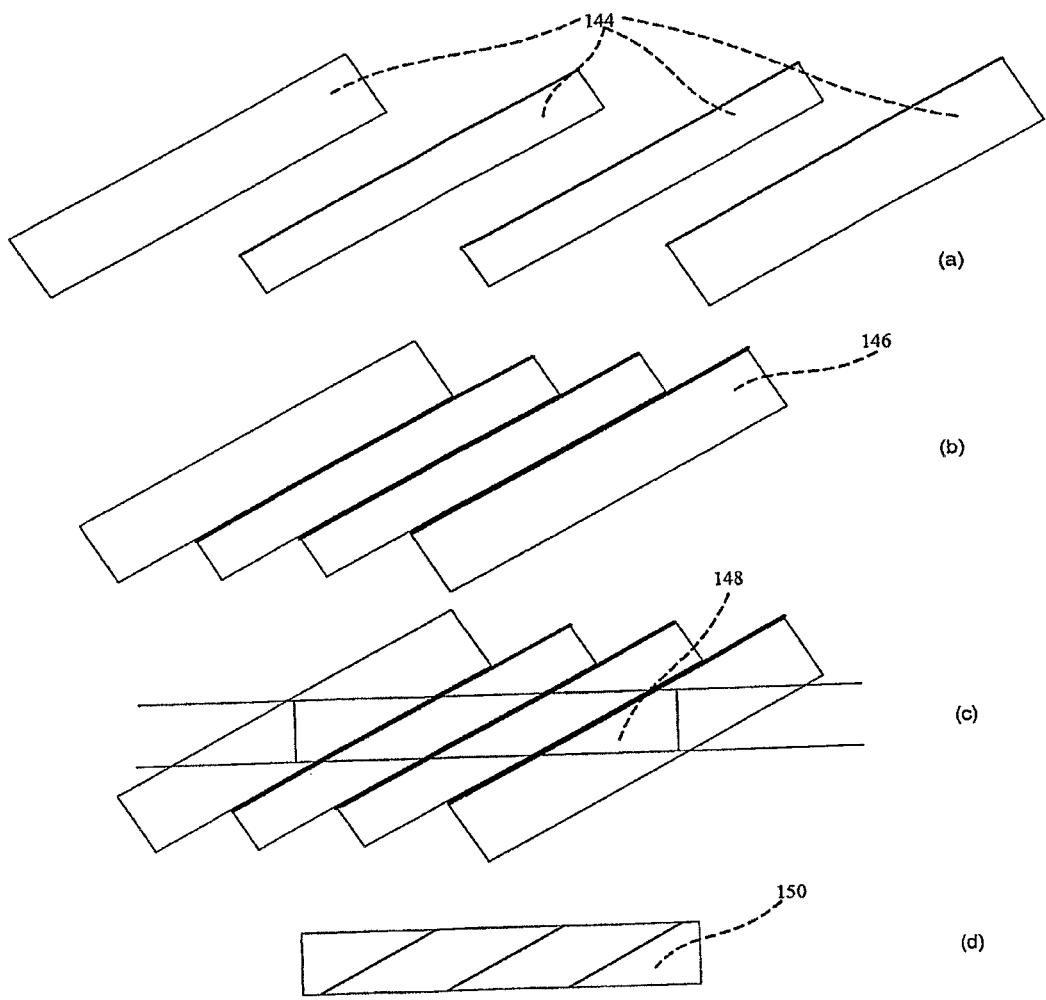
Figure 21:
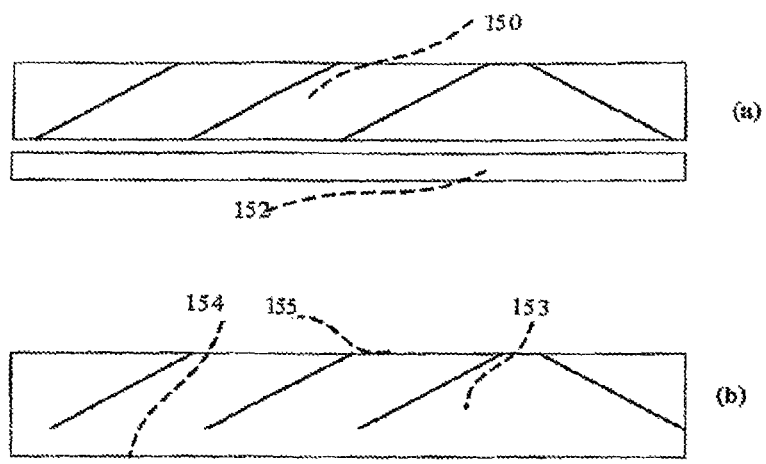
Figure 22:
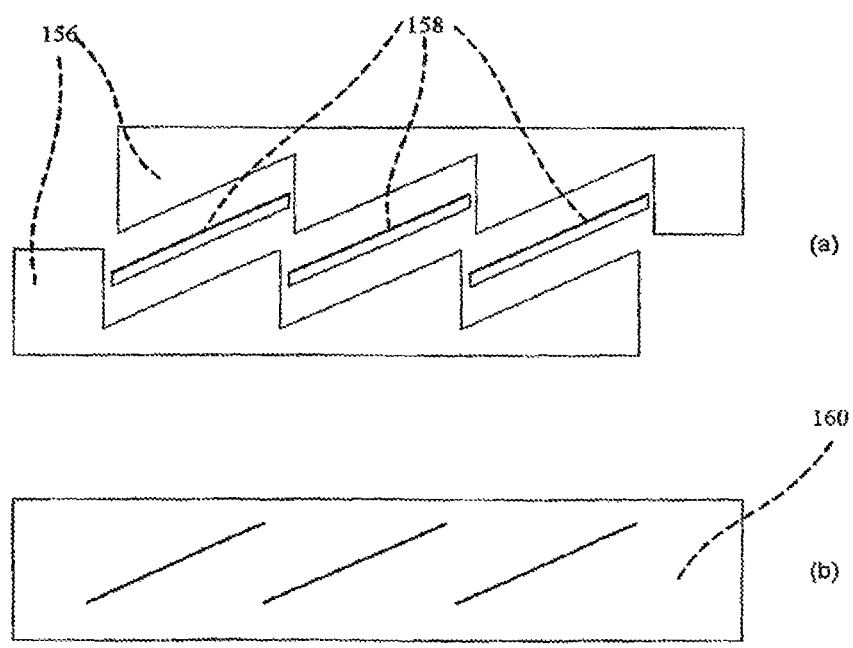
Figure 23:
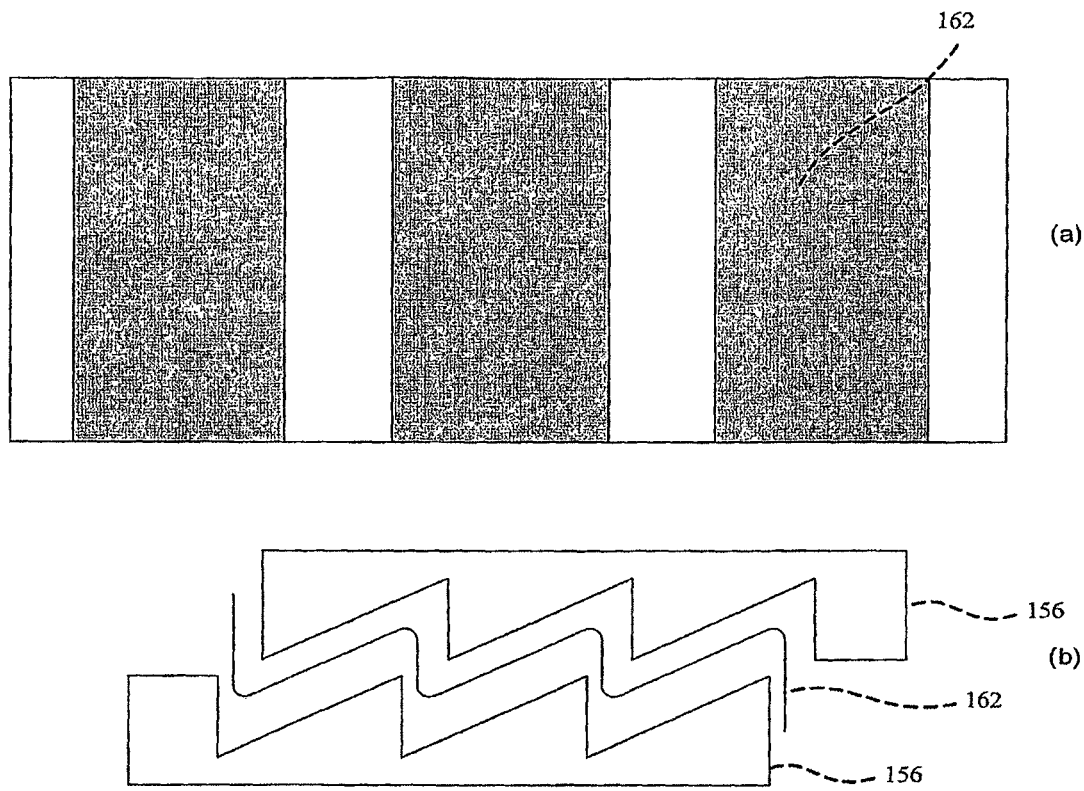
Figure 24:
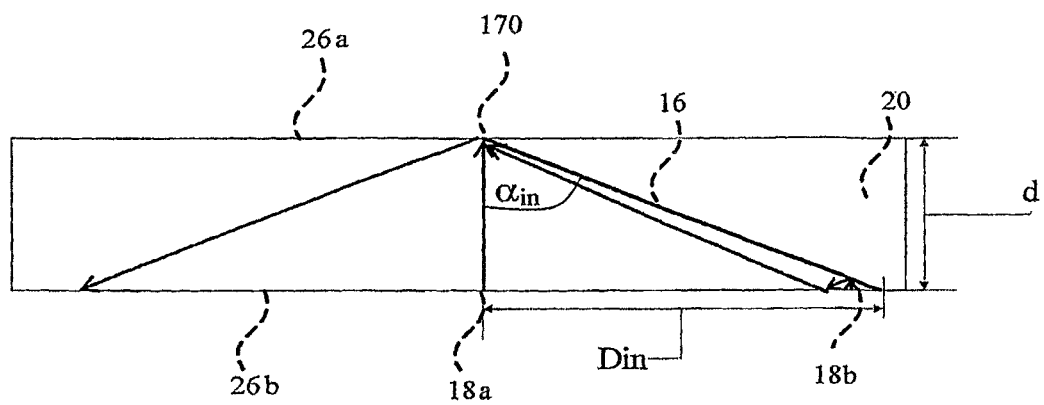
Figure 25:
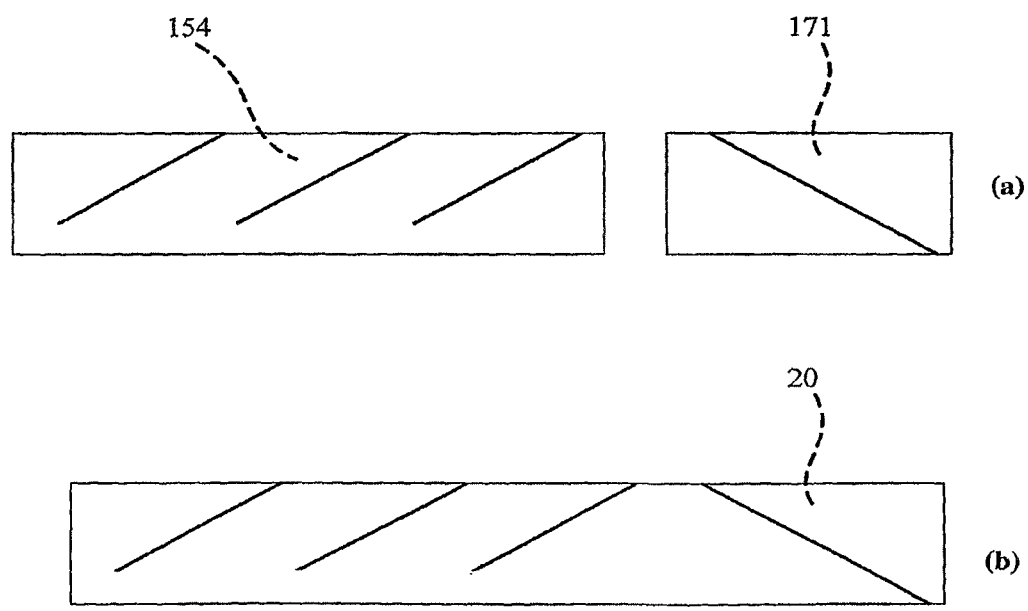
Figure 26:
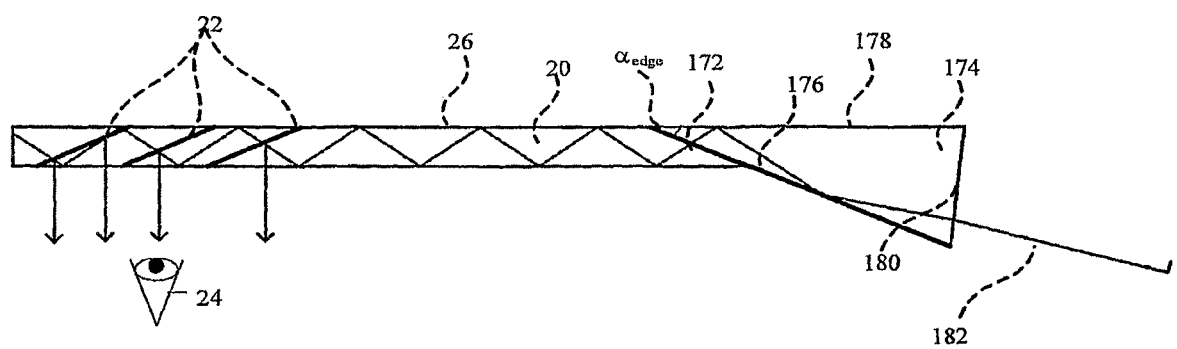
Figure 27:
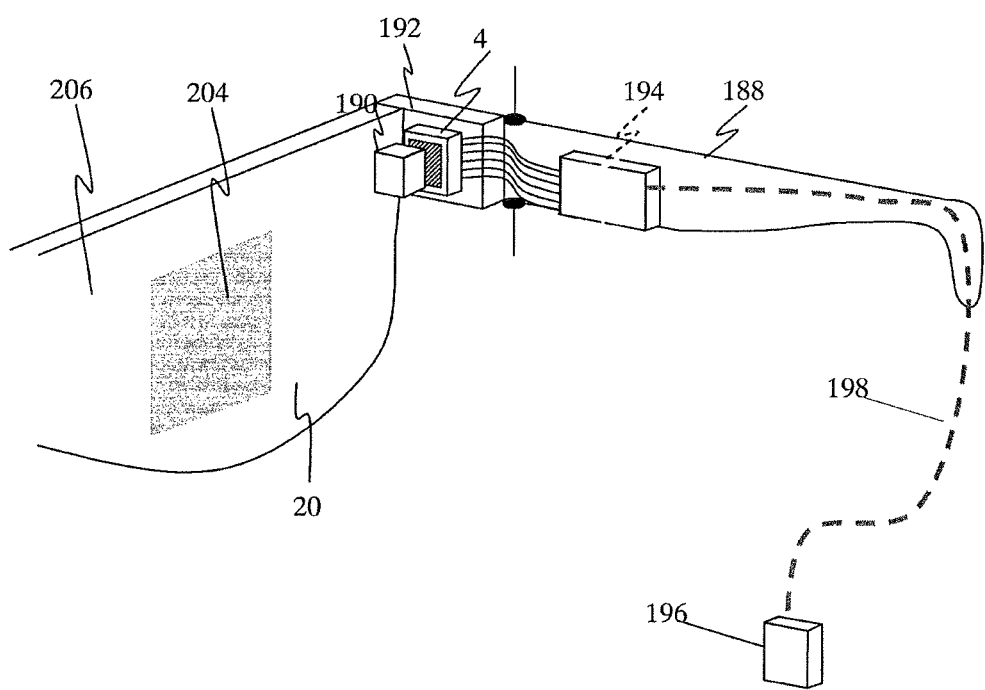
Figure 28:
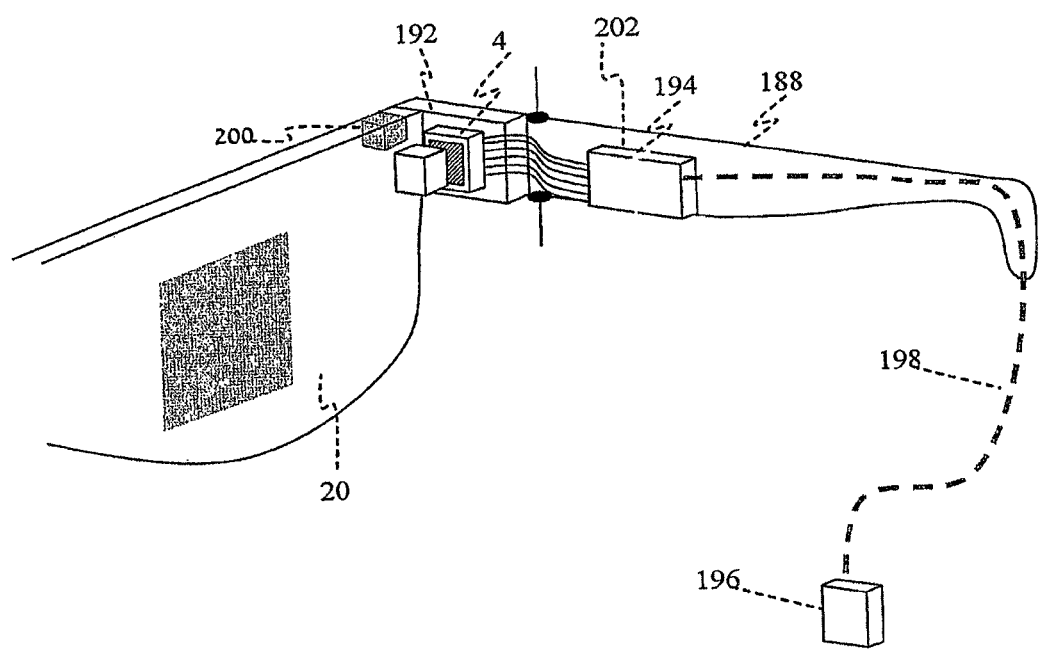
Figure 29:
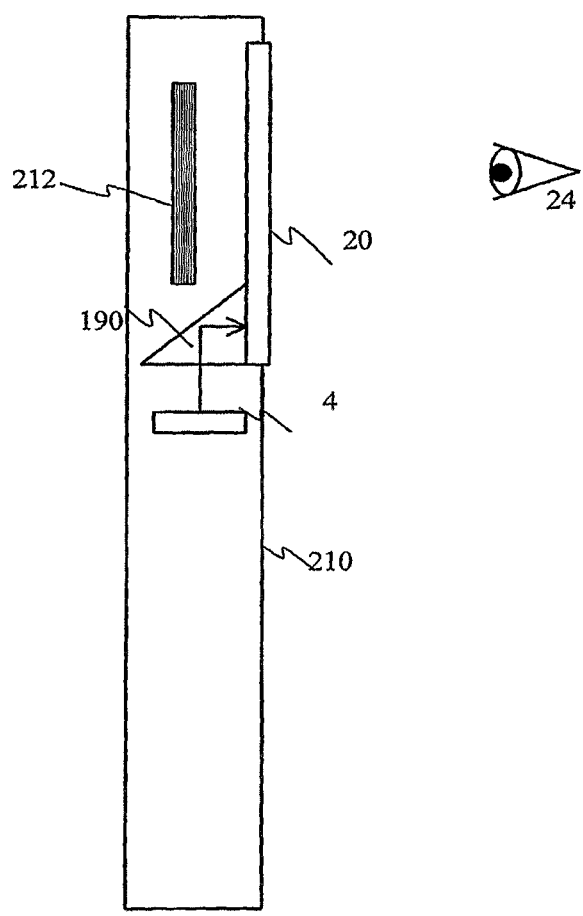
Figure 30:
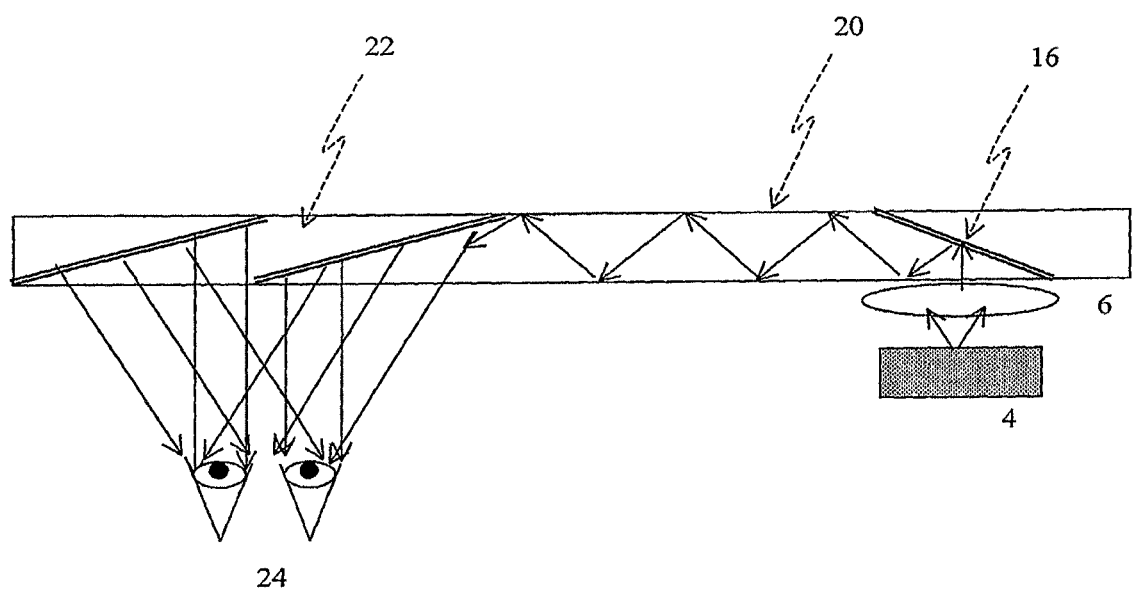

FIG. 1 is a side view of a generic form of a prior art folding optical device;

FIG. 2 is a side view of an exemplary LOE, in accordance with the present invention;

FIGS. 3A and 3B illustrate the reflectance and the transmittance performance of an anisotropic reflecting surface which is oriented to respectively reflect s-polarized light waves and p-polarized light waves;

FIG. 4 illustrates a detailed sectional view of an exemplary array of selectively reflective surfaces;

FIG. 5 illustrates a detailed sectional view of an exemplary array of selectively reflective surfaces with a retardation plate;

FIG. 6 illustrates a detailed sectional view of an exemplary array of selectively reflective surfaces with a second retardation plate attached to the first surface of the substrate;

FIG. 7 is a schematic sectional-view of a reflective surface according to the present invention;

FIG. 8 is a diagram illustrating the polarization vector of the coupled wave and the major axis of a reflective surface;

FIG. 9 is a diagram illustrating the polarization vector of the coupled wave and the major axis of another reflective surface;

FIG. 10 is a schematic sectional-view of a reflective surface with two different impinging rays according to the present invention;

FIG. 11 illustrates a sectional view of an exemplary array of selectively reflective surfaces wherein a blank plate is attached to the substrate edge;

FIG. 12 illustrates the active aperture-size of the reflecting surfaces as a function of the field angle for an exemplary LOE;

FIG. 13 is a schematic sectional-view of a reflective surface according to the present invention illustrating the actual active aperture of the surface;

FIG. 14 illustrates detailed sectional views of the reflectance from an exemplary array of selectively reflective surfaces, for three different viewing angles;

FIG. 15 illustrates detailed sectional views of the reflectance from an exemplary array of selectively reflective surfaces, for two different viewing angles;

FIG. 16 illustrates the required distance between two adjacent reflecting surfaces as a function of the field angle for an exemplary LOE;

FIG. 17 illustrates a sectional view of an exemplary array of selectively reflective surfaces wherein a wedged blank plate is attached to the substrate edge;

FIG. 18 is a diagram illustrating steps (a) to (e) of a method for fabricating an array of partially reflecting surfaces according to the present invention;

FIG. 19 is a diagram illustrating steps (a) to (e) of another method for fabricating an array of partially reflecting surfaces according to the present invention;

FIG. 20 is a diagram illustrating steps (a) to (e) of a modified method for fabricating an array of partially reflecting surfaces according to the present invention;

FIG. 21 is a diagram illustrating steps (a) and (b) of a method to attach a blank plate at the edge of the LOE;

FIG. 22 is a diagram illustrating steps (a) and (b) in a further method for fabricating an array of partially reflecting surfaces, according to the present invention;

FIG. 23 is a diagram illustrating steps (a) and (b) of still a further method for fabricating an array of partially reflecting surfaces, according to the present invention, FIG. 24 is a schematic sectional-view of a reflective surface embedded inside an LOE;

FIG. 25 is a diagram illustrating steps (a) and (b) of a method for fabricating an array of partially reflecting surfaces along with a coupling-in reflecting surface according to the present invention;

FIG. 26 illustrates an exemplary ray which is coupled into an LOE system by a coupling-in prism;

FIG. 27 illustrates an exemplary embodiment of an LOE embedded in a standard eyeglass frames;

FIG. 28 illustrates an exemplary embodiment of an LOE embedded in a standard eyeglass frames wherein a video camera is attached to the eyeglass frames;

FIG. 29 illustrates an exemplary embodiment of an LOE embedded in a hand carried display system, and FIG. 30 illustrates an exemplary HUD system in accordance with the present invention.

DETAILED DESCRIPTION OF THE PREFERRED EMBODIMENTS

FIG. 1 illustrates a prior art folding optics arrangement, wherein the substrate 2 is illuminated by a display source 4. The display is collimated by a collimating lens 6. The light from the display source 4 is coupled into substrate 2 by a first reflecting surface 8, in such a way that the main ray 10 is parallel to the substrate plane. A second reflecting surface 12 couples the light waves out of the substrate and into the eye 14 of a viewer. Despite the compactness of this configuration, it suffers significant drawbacks; in particular only a very limited FOV can be affected. As shown in FIG. 1, the maximum allowed off-axis angle inside the substrate is:

$$\alpha_{max} = \arctan\left(\frac{T - d_{eye}}{2l}\right), \quad (1)$$

wherein T is the substrate thickness;

$d_{eye}$ is the desired exit-pupil diameter, and l is the distance between reflecting surfaces 8 and 12.

With angles higher than $\alpha_{max}$, the rays are reflected from the substrate surface before arriving at the reflecting surface 12. Hence, the reflecting surface 12 will be illuminated at an undesired direction and ghost images will appear.

Therefore, the maximum achievable FOV with this configuration is:

$$FOV_{max} \approx 2\nu\alpha_{max}, \quad (2)$$

wherein $\nu$ is the refractive index of the substrate.

Typically the refractive index values lie in the range of 1.5-1.6.

Commonly, the diameter of the eye pupil is 2-6 mm. To accommodate movement or misalignment of the display, a larger exit-pupil diameter is necessary. Taking the minimum desirable value at approximately 8-10 mm, the distance between the optical axis of the eye and the side of the head, l, is, typically, between 40 and 80 mm. Consequently, even for a small FOV of 8°, the desired substrate thickness would be of the order of 12 mm.

Methods have been proposed to overcome the above problem. These include, utilizing a magnifying telescope inside the substrate and non-parallel coupling directions. Even with these solutions however, and even if only one reflecting surface is considered, the system thickness remains limited by a similar value. The FOV is limited by the diameter of the projection of the reflective surface 12 on the substrate plane. Mathematically, the maximum achievable FOV, due to this limitation, is expressed as:

$$FOV_{max} \approx \frac{T\tan\alpha_{sur} - d_{eye}}{R_{eye}}, \quad (3)$$

wherein, $\alpha_{sur}$, is the angle between the reflecting surface and the normal to the substrate plane, and $R_{eye}$, is the distance between the eye of the viewer and the substrate (typically, about 30-40 nun).

In practice, $\tan\alpha_{sur}$ cannot be much larger than 1; hence, for the same parameters described above for a FOV of 8°, the required substrate thickness here is of the order of 7 mm, which is an improvement on the previous limit. Nevertheless, as the desired FOV is increased, the substrate thickness increases rapidly. For instance, for desired FOVs of 15° and 30° the substrate limiting thickness is 18 mm and 25 mm, respectively.

To alleviate the above limitations, the present invention utilizes an array of selectively reflecting surfaces, fabricated within an LOE. FIG. 2 illustrates a sectional view of an LOE according to the present invention. The first reflecting surface 16 is illuminated by a collimated display 18 emanating from a light source (not shown) located behind the device. The reflecting surface 16 reflects the incident light from the source such that the light waves are trapped inside a planar substrate 20 by total internal reflection. After several reflections off the surfaces of the substrate, the trapped light waves reach an array of selectively reflecting surfaces 22, which couple the light waves out of the substrate into the eye 24 of a viewer. Assuming that the central wave of the source is coupled out of the substrate 20 in a direction normal to the substrate surface 26, the reflecting surfaces 22 are flat, and the off-axis angle of the coupled wave inside the substrate 20 is $\alpha_{in}$, then the angle $\alpha_{sur2}$ between the reflecting surfaces and the normal to the substrate plane is:

$$\alpha_{sur2} = \frac{\alpha_{in}}{2}. \quad (4)$$

As can be seen in FIG. 2, the trapped rays arrive at the reflecting surfaces from two distinct directions 28, 30. In this particular embodiment, the trapped rays arrive at the reflecting surface from one of these directions 28 after an even number of reflections from the substrate front and back surfaces 26, wherein the incident angle $\beta_{ref}$ between the trapped ray and the normal to the reflecting surface is:

$$\beta_{ref} = 90° - (\alpha_{in} - \alpha_{sur2}) = 90° - \frac{\alpha_{in}}{2}. \quad (5)$$

The trapped rays arrive at the reflecting surface from the second direction 30 after an odd number of reflections from the substrate surfaces 26, where the off-axis angle is $\alpha'_{in} = 180° - \alpha_{in}$ and the incident angle between the trapped ray and the normal to the reflecting surface is:

$$\beta'_{ref} = 90° - (\alpha'_{in} - \alpha_{sur2}) = 90° - (180° - \alpha_{in} - \alpha_{sur2}) = -90° + \frac{3\alpha_{in}}{2}. \quad (6)$$

As illustrated in FIG. 2, for each reflecting surface, each ray first arrives at the surface from the direction 30, wherein some of the rays impinge on the surface again, from direction 28. In order to prevent undesired reflections and ghost images, it is important that the reflectance be negligible for the rays that impinge on the surface having the second direction 28. The desired discrimination between the two incident directions can be achieved by exploiting the fact that the undesired direction meets the surface after the ray has transferred the surface in the desired direction. Two solutions to this requirement, both exploiting angular sensitivity of thin film coatings were previously proposed. An alternative solution is presently described, exploiting anisotropic reflecting surfaces, that is, optical surfaces having a major axis parallel to the surface plane wherein the reflection and transmission properties of the surface at least partly depend on the orientation of the polarization of the incident light waves in relation to the major axis of the surface.

FIG. 3A illustrates an example of an anisotropic partially reflecting surface acting as a beamsplitter 40, having a major axis 42. An unpolarized light wave 44 impinges on the surface. The partially reflecting surface reflects the component of the light wave 46 with an electrical field vector parallel to the major axis 42 and transmits the component of the light wave 48 with an electrical field vector perpendicular to the major axis 42.

A possible candidate for the required anisotropic partially reflecting element can be a wire grid polarizing beamsplitter 40, generally in the form of an array of thin parallel conductors supported by a transparent substrate. The key factor that determines the performance of a wire grid polarizing beamsplitter 40 is the relationship between the center-to-center spacing, or period, of the parallel grid elements and the wavelength of the incident radiation. When the grid spacing or period is much shorter than the wavelength, the grid functions as a polarizing beamsplitter 40 that reflects electromagnetic radiation polarized parallel to the grid elements. and transmits radiation of the orthogonal polarization. In this case, as illustrated in FIG. 3A, the major axis of a wire grid polarizing beamsplitter 40 is defined as parallel to the array of conductors 49. Usually, in order to obtain the best transmission and contrast, the wire grid polarizing beamsplitter 40 should be used to transmit the p-polarization and reflect the s-polarization, as illustrated in FIG. 3A. However, as illustrated in FIG. 3B it is possible to use the beamsplitter also in the orthogonal orientation. That is, the main axis 52 of the polarizing beamsplitter 50 is oriented parallel to the propagation direction of the incident beam 44. Since now the major axis of the polarizing beamsplitter 50 is parallel to the electric field of the p-polarized light, the polarizing beamsplitter 50 reflects the component of the p-polarized light waves 56 with its electrical field vector parallel to the major axis 52 and transmits the component of the s-polarized light 58 with its electrical field vector perpendicular to the major axis 52. Usually, the geometry illustrated in FIG. 3A has reduced efficiency and contrast compared to the one described in FIG. 3B. However, for some applications this geometry can also be useful.

FIG. 4 illustrates an example of an LOE, exploiting wire grid polarizing beamsplitters as partially reflecting surfaces, according to the present invention. The first reflecting surface 16 is illuminated by an unpolarized collimated display 18 emanating from a light source (not shown) located behind the device. The reflecting surface 16 reflects the incident light waves from the source such that the light waves are trapped inside a planar substrate 20 by total internal reflection. After several reflections off the surfaces of the substrate, the trapped light waves reach the first partially reflecting surface 22a, the major axis of which is oriented to reflect the s-polarized component 60 of the trapped wave 18. The p-polarized component 62 is transmitted through the reflecting surface 22a and then reflected by the second reflecting surface 22b, the major axis of which is oriented to reflect p-polarized light waves. Both the s-polarized 60 and the p-polarized 62 light waves are coupled out of the substrate into the eye of a viewer. Naturally, for this configuration the polarization of the input beam should be uniform. Hence, care must be taken to prevent birefringent effects from the collimating lens as well as in the substrate 20 itself.

An LOE with non-identical selectively reflecting surfaces has two issues which must be addressed. In see-through systems, such as head-mounted displays for pilots, wherein the viewer should see the external scene through the LOE, the transmittance of the selectively reflecting surfaces should be relatively high. Since in this case the reflectance coefficient is not identical for all of the selectively reflecting surfaces, there is a danger that this would result in a non-uniform image of the external scene viewed through the substrate. In the geometry illustrated in FIG. 5, the transmittance of surfaces 22a and 22b for the external light, is around 50% for both reflecting surfaces. Surface 22a transmits the p-polarized component of the external light, while surface 22b transmits the s-polarized component. In other situations, where such potential non-uniformity is crucial, a complementary non-uniform coating could be added on the external surface of the substrate, to compensate for the non-uniformity of the substrate and to achieve a view of uniform brightness over the entire FOV.

The other phenomenon that might result from the proposed configuration, is the polarization non-uniformity of both projected and external scenes. For most of the potential applications, this non-uniformity does not cause any disturbance, but for some applications, the achievement of uniformly polarized projected and external images over the entire aperture may be necessary. This non-uniformity can be corrected by inserting an optional retardation plate between the substrate and the eye. As illustrated in FIG. 5 a half-wavelength plate 64 is inserted next to the projection of the first reflecting surface 22a on the front surface 26. As a result, the polarization of the reflecting wave 66 is rotated to p-polarization while the polarization of the transmitted external wave 67 is rotated to s-polarization. For the second surface 22b the reflecting wave 62 and the transmitted wave 68 remained p- and s-polarized respectively. As a result, the entire projected image is p-polarized while the entire image of the external scene is s-polarized. Naturally, it is possible to invert these polarizations by inserting the half-wavelength plate next to the second reflecting surface 22b to yield an s-polarized projected image with a p-polarized external scene.

Another possible problem, which is related to see-through systems, is the orientation of the major 'axis of the second reflection surface 22a. As illustrated in FIG. 5 the polarizing beamsplitter is oriented to reflect p-polarized light waves. For impinging light waves 62 having incident angles smaller than 30°, this might be sufficient to achieve good contrast. However, for higher incident angles the reflecting surface 22b might have reduced efficiency and contrast compared to that of surface 22a. As illustrated in FIG. 6, this problem might be solved by inserting an off axis half-wave plate 69 in front of surface 22b, and by setting the orientation of the major axis of surface 22b to be. the same as surface 22a. That is, wire grid polarizing beamsplitter is oriented to reflect the s-polarization and transfer the p-polarization. Therefore, the polarization of the beam 62 is rotated by 90° to s-polarization, before impinging on surface 22b. The s-polarized light waves is then reflected with high efficiency and contrast from surface 22b and again rotated by 90° to be p-polarized. As can be seen in FIG. 6, the external scene is s-polarized to the viewer's eye. However, only the p-polarized component of the external scene is transmitted through the reflecting surfaces 22a and 22b. This might be a problem for applications where it is required to observe an s-polarized image in the external scene, such as an LCD display or the like. In these cases, it is possible to insert another retardation plate 65 next to the front surface 26. Thus, if a half-wavelength plate is inserted then only the s-polarized component light waves from the external scene are projected into the viewer's eye, and if a quarter-wave plate is inserted, then half of the energy from the s-polarized as well as the p-polarized light waves are projected from the external scene.

In non-see-through systems, such as virtual-reality displays, the substrate can be opaque and the transmittance of the system has no importance. In that case, it is possible to utilize a simple reflecting mirror instead of the second partially reflecting surface 22b. Again, it is possible to insert a half-wavelength plate next to one of the reflecting surface to achieve a uniformly polarized projected image.

FIG. 7 is a detailed sectional view of the selectively reflective surface 22a, which couples light waves trapped inside the substrate out, and into the eye of a viewer. As can be seen, in each cycle the coupled ray 18 passes through reflecting surfaces 22a three times. At the first incident point 70, the s-polarized component 72 is reflected and coupled out of the substrate. The transmitted p-polarized component 74 is reflected off the outer surfaces 26 and then meets surface 22a again at points 76 and 78. At these points, however, the incident light waves are p-polarized, while the orientation of surface 22a is set to reflect s-polarized light waves and to transmit p-polarized light waves. Hence, the reflections at these points can be negligible, as required above, in relation to FIG. 2, in order to prevent undesired reflections and ghost images.

Naturally, this concept can be valid not only for the example illustrated in FIGS. 4, 5 and 6 but also in more general cases, wherein more than two partially reflecting surfaces are utilized to project the image into the eyes of a viewer.

Referring now to FIG. 8, assuming a system wherein s-polarized light waves are coupled inside the substrate and the major axis of the first reflecting surface is orientated at an angle $\beta_1$ to the projection of the propagation direction of the coupled beam in the plane of the reflecting surface, the angle between the major axis 80 and the electric field of the coupled wave 82 is $90°-\beta_1$. The coupled light can be separated into two components, one 84, which is orthogonal to the major axis 80 and transmitted through the surface 22a, and the second 86, which is parallel to the major axis 80 and is reflected by surface 22a at the first incident of the light at this surface. Since after the first reflection from surface 22a, only the orthogonal component 84 is transmitted and continues to propagate inside the substrate, at the following incident points (if any) at surface 22a, the reflectance of the coupled wave is negligible. Assuming that the initial intensity of the coupled radiation is $I_0$, the intensities of the reflected and the transmitted components are:

$$I_0^r = I_0 \cdot \sin^2(\beta_1) \tag{7}$$

and $$I_0^t = I_0 \cdot \cos^2(\beta_1) \tag{8}$$

respectively.

As illustrated in FIG. 9, in order to enable reflectance of the coupled wave from the second surface 22b, the major axis 90 of this surface is oriented at an angle $\beta_2$ to the projection of the propagation direction of the coupled wave in the plane of the reflecting surface. Assuming that when passing through the wire grid polarizing beamsplitter the skew-ray transmitted polarization vector is not rotated in comparison to the original polarization vector, the polarization of the coupled wave is oriented now at an angle $\beta_1$ to the s-polarization, the angle between the major axis 90 and the electric field of the coupled wave 92 is $90°-\beta_1-\beta_2$. The intensity of the coupled wave before impinging on surface 22b is now:

$$I_1 = I_0^t = I_0 \cdot \cos^2(\beta_1) \tag{9}$$

And the intensities of the transmitted and reflected components 94, 96 are:

$$I_1^t = I_1 \cdot \cos^2(\beta_1+\beta_2) \tag{10}$$

and $$I_1^r = I_1 \cdot \sin^2(\beta_1+\beta_2) \tag{11}$$

respectively.

Inserting Eq. (9) into Eqs. (10) and (11) yields:

$$I_1^t = I_0 \cdot \cos^2(\beta_1) \cdot \cos^2(\beta_1+\beta_2) \tag{12}$$

and $$I_1^r = I_0 \cdot \cos^2(\beta_1) \cdot \sin^2(\beta_1+\beta_2) \tag{13}$$

For systems where uniform brightness over the entire aperture is necessary, the reflectance intensity from surfaces 22a and 22b should be the same, that is $$I_1^r = I_0^r. \tag{14}$$

Inserting Eqs. (7) and (13) into Eq. (14) yields:

$$I_0 \cdot \cos^2(\beta_1) \cdot \sin^2(\beta_1+\beta_2) = I_0 \cdot \sin^2(\beta_1) \tag{15}$$

or $$\sin(\beta_1+\beta_2) = \tan(\beta_1). \tag{16}$$

Similarly, it is possible to calculate the orientation angle $\beta_n$ of each of the plurality of the following reflecting surfaces 22n, in order to achieve a uniform brightness or any other required brightness distribution of the projected image. Usually, it is easier to start designing the orientation of the major axis of the reflecting surfaces from the last surface. Assuming that uniform brightness is required and that the utilization of all the trapped energy inside the substrate is desired, then the last surface should couple the entire coupled light waves out of the substrate. That is, the orientation of the major axis of the last surface should be parallel to the polarization of the trapped light waves at that surface. Correspondingly, the surface before the last should reflect half of the incident wave, that is, the orientation of the major axis of this surface should be inclined at an angle of 45° with respect to the polarization of the incident wave at this surface. In the same way, it is possible to calculate the orientation angles of the other surfaces and the required polarization of the trapped wave 18. This design procedure might be modified by rotating the trapped light waves using retardation plates, similar to that of surface 69 which is described above in reference to FIG. 6. In addition, the polarization of the waves might be rotated by attaching retardation plates to one or both of the external major surfaces of the substrate. In each case, the orientation of the major axis of each reflecting surface should be set accordingly. Furthermore, during any design method, a possible rotation of the trapped light waves due to the total internal reflection from the external surfaces, or any loss due to absorption in the reflecting surfaces or in the retardation plates, should be accounted for.

Another issue that should be considered is the actual active area of each reflecting surface. FIG. 10 illustrates a detailed sectional view of the selectively reflective surface 22, which couples light waves trapped inside the substrate out and into the eye of a viewer. As can be seen, the ray 18a is reflected off the upper surface 26, next to the line 100, which is the intersection of the reflecting surface 22 with the upper surface 26. Since this ray does not impinge on the reflecting surface 22, its polarization remains the same and its first incidence at surface 22 is at the point 102, after double reflection from both external surfaces. At this point, the wave is partially reflected and the ray 104 is coupled out of the substrate. For other rays, such as ray 18b, which is located just below ray 18a, the first incidence at surface 22 is at point 106, before it meets the upper surface 26. Hence, when it is again incident on surface 22, at point 110 following double reflection from the external surfaces, the polarization of the ray is normal to that of the major axis of surface 22 and the reflectance there is negligible. As a result, all the rays with the same coupled-in angle as 18a that incident on surface 22 left to the point 102 are not reflected there. Consequently, surface 22 is actually inactive left of the point 102 for this particular couple-in angle.

Since the inactive portions of the selectively reflecting surfaces 22 do not contribute to the coupling of the trapped light waves out of the substrate, their impact on the optical performance of the LOE can be only negative. Thus, if there is no overlapping between the reflecting surfaces, then there will be inactive optical portions in the output aperture of the system and "holes" will exist in the image. On the other hand, the inactive portions of the reflecting surfaces are certainly active with respect to the waves from the external scene. In addition, the major axis orientation of two adjacent surfaces cannot be identical; otherwise the entire second surface will be inactive. Therefore, if overlapping is set between the reflective surfaces to compensate for the inactive portions in the output aperture then rays from the output scene that cross these overlapped areas will suffer from double attenuations and holes will be created in the external scene.

FIG. 11 illustrates a method of overcoming this problem. Only the active portions of the partially reflecting surfaces are embedded inside the substrate, and since the reflecting surfaces are adjacent to one another, there will be no holes in the projected image, and since there is no overlap between the surfaces there will be no holes in the external view. To achieve that, a blank plate 111 is attached, preferably by optical cementing, to the active area of the substrate, preferably by optical cementing.

In order to utilize the active areas of the reflective surfaces 22 only in the correct manner, it is important to calculate the actual active area of each reflective surface. As illustrated in FIG. 12, the active aperture, Dn, of the reflective surface 22n in the plane of the external surface, as a function of the coupled-in angle $\alpha_{in}$, is:

$$D_n = d \cdot \frac{\cot(\alpha_{sur}) + \cot(\alpha_{in})}{2}. \quad (17)$$

Since the trapped angle $\alpha_{in}$, can be varied as a function of the FOV, it is important to know with which angle to associate each reflecting surface 22n, in order to calculate its active aperture.

FIG. 13 illustrates the active aperture as a function of field angle for a system having the parameters: substrate thickness d=4 mm, substrate refractive index v=1.51, and reflective surface angle $\alpha_{sur}$=64°.

In consideration of the viewing angles, it is noted that different portions of the resulting image originate from different portions of the partially reflecting surfaces.

FIG. 14 constitutes a sectional view of a compact LOE display system based on the proposed configuration, illustrates this effect. Here, a single plane wave 112, representing a particular viewing angle 114, illuminates only part of the overall array of partially reflecting surfaces 22. Thus, for each point on the partially reflecting surface, a nominal viewing angle is defined, and the required active area of the reflecting surface is calculated according to this angle.

The exact, detailed design of the active area of the various partially reflective surfaces is performed as follows: for each particular surface, a ray is plotted (taking refraction, due to Snell's Law, into consideration) from the left edge of the surface to the center of the designated eye pupil 24. The calculated direction is set as the nominal incident direction and the particular active area is calculated according to that direction. The exact values of the reflecting surfaces active areas can be used to determine the various distances between the reflecting surfaces 22. A larger active area dictates a larger inter-surface distance. However, more accurate calculations should be performed in order to determine exact distances between any two adjacent reflecting surfaces.

FIG. 15 illustrates this issue. As explained above, the projection of each surface is adjacent to its neighbor so as to avoid either overlapping or gaps between the reflecting surfaces. However, this is true for the central viewing angle only. For the right-most reflecting surface, there are gaps 116 between the right-most surfaces, whereas there is overlapping 118 between the left-most surfaces. Controlling the distances between each pair of adjacent surfaces 22 can solve this problem. That is, the inter-surface distances will be smaller for the right surfaces and larger for the left surfaces. As a result, this effect partially compensates the divergence in surface distances, which is described above with regards to active area sizes.

FIG. 16 illustrates the required distance between two adjacent surfaces as a function of the field angle for the same parameters as set above in reference to FIG. 13. As above, the detailed design of the distance between to adjacent reflecting surfaces is performed as follows: for each particular surface, a ray is plotted (taking refraction, due to Snell's Law, into consideration) from the left edge of the surface to the center of the designated eye 24. The calculated direction is set as the nominal incident direction and the particular distance is calculated according to that direction.

FIG. 17 illustrates an LOE 20 with reflecting surfaces 22 which have different active apertures and different distances between the adjacent surfaces accordingly. In order to achieve the required structure, a wedged substrate 20, i.e., wherein the two major surfaces are non-parallel, can be constructed. A complementary blank wedged plate 119 is attached to the substrate, preferably by optical cementing, in such a way that the combined structure from a complete rectangular parallelepiped. That is, the two outer major surfaces of the final LOE are parallel to each other. It is important to note that the complementary blank wedged plate can be utilized not only for LOE having anisotropic reflecting surfaces but also for other types of LOEs, wherein all the partially reflective surfaces are exploiting isotropic angular sensitive thin film coatings. Usually, the geometry presented in FIG. 17 is required only for systems with a large number of facets or when the exact dimension of the overall output aperture is critical. For most systems a simpler geometry, which is described in reference to FIG. 11, may be sufficient. Considering, for example~an optical system of three reflecting surfaces with the same parameters as described in reference to FIG. 12, and with an eye-relief (the distance between the eye of a viewer and the LOE) of $R_{eye}$=30 mm, the calculated active areas of the surfaces are 6.53 nun, 5.96 mm and 5.45 mm. It is possible to fabricate a much simpler LOE having apertures of 6 mm for all three surfaces. The overall output aperture is smaller by 0.5 mm than for the optimal configuration, but the fabrication process is much simpler. The leftmost 0.5 mm of the third surface is not active, but this causes no interference, since there is no overlapping there.

FIG. 18 illustrates a method of fabricating the required array of partially reflecting surfaces. First at step (a), a group of prisms 120 and an associated group of anisotropic reflecting surfaces (mounted on thin plates) 122 are manufactured, having the required dimensions. The prisms 120 can be fabricated from silicate-based materials such as BK-7 with the conventional techniques of grinding and polishing, or alternatively, they can be made from polymer or sol-gel materials using injection molding or casting techniques. Finally at step (b), the prisms and the reflecting surface plates are glued together to form the desired LOE 124. For applications in which the quality of the optical surfaces is critical, the final step (c) of polishing the outer surfaces 126 can be added to the process. A modified version of this process can be performed if the anisotropic reflecting surfaces 128 are fabricated directly onto the surfaces of the prisms (step (d)) and then the prisms are glued together to create the desired LOE 130 (step (e)).

FIG. 19 illustrates another method of fabricating an array of partially reflecting surfaces. A plurality of transparent flat plates 132 and anisotropic reflecting surfaces 134 step (a) are glued together so as to create a stacked form 136 step (b). A segment 138 step (c) is then sliced off the stacked form by cutting, grinding and polishing, to create the desired LOE 140 step (d). Several elements 142 can be sliced off from this stacked form, as shown in (e).

FIG. 20 illustrates a modified method of fabricating an array of partially reflecting surfaces. Here the anisotropic reflecting surfaces 144 at (a) are fabricated directly onto the surfaces of the plurality of transparent flat plates, which are glued together so as to create a stacked form 146 step (b). A segment 148 (c) is then sliced off the stacked form by cutting, grinding and polishing, to create the desired LOE 150, as shown in (d).

FIG. 21 illustrates a method, applicable to each of the fabrication methods described in reference to FIGS. 18 to 20 in which a blank plate 152 step (a) is attached to one of the major surfaces of the substrate 150, preferably using optical cement, so as to form an LOE 153 step (b) with the appropriate active apertures for all of the reflecting surfaces. In order to materialize the LOE illustrated in FIG. 17, both the substrate 150 and the blank plate 152 have a wedge structure. In that such a case it is usually required that the two external major surfaces, 154 and 155, are parallel to each other.

FIG. 22 illustrates yet another method of fabricating the array of partially reflecting surfaces. Two similar, tooth-shaped transparent forms 156 are fabricated step (a), by injection-molding or casting. The required anisotropic reflecting surfaces 158 are inserted in the appropriate places between the forms and the two forms are then step (b) glued together, to create the required LOE 160.

FIG. 23 illustrates yet another version of the method described in FIG. 21 for fabricating the array of partially reflecting surfaces. Instead of inserting the reflecting surfaces 158, the surfaces are applied at step (a) to a very thin and flexible polymer sheet 162. Then, at step (b), the sheet 162 is inserted between forms 156, which are then glued together to create the requested LOE.

So far it has been described how to fabricate the coupling-out active area of the LOE. However, it should be noted that it is important not only to couple the image out of the substrate without any distortion or ghost image but also to couple the light waves properly into the substrate. FIG. 24, which illustrates one method for coupling-in, presents a sectional view of the reflective surface 16, which is embedded inside the substrate 20 and couples light waves 18 from a display source (not shown) and traps it inside the substrate 20 by total internal reflection. To avoid an image with gaps or stripes, it is essential that the trapped light cover the entire area of the LOE major surfaces. To ensure this, the points on the boundary line 170 between the edge of the reflective surface 16 and the upper surface 26a of the substrate 20 should be illuminated for a single wave by two different rays that enter the substrate from two different locations; a ray 18a, which illuminates the boundary line 170 directly, and another ray 18b, which is first reflected by the reflecting surface 16 and then by the lower surface 26b of the substrate, before illuminating the boundary line. As illustrated in FIG. 25, the coupling-in substrate 171 can be attached step (a) at one of its peripheral sides to the coupling out substrate 154, to form step (b), a complete LOE form 20.

The embodiment described above with regards to FIG. 24 is an example of a method for coupling input light waves into the substrate through one of the major surfaces of substrate. Input light waves, can, however, be coupled into the substrate by other optical means as well, including (but not limited to) folding prisms, fiber optic bundles, diffraction gratings, and other techniques. Also, in the example illustrated in FIG. 2, the input light waves and the image light waves are located on the same side of the substrate. Other configurations are envisioned in which the input and the image light waves could be located on opposite sides of the substrate.

In certain applications it is necessary to couple the input light waves into the substrate through one of the peripheral sides of the substrate. FIG. 26 illustrates a method of coupling light waves into the substrate through one of its edges. Here, the light waves-transmitting substrate has two major parallel surfaces 26 and edges, wherein at least one edge 172 is oriented at an oblique angle with respect to the major surfaces and wherein $\alpha_{edge}$ is the angle between the edge 172 and the normal to the major surfaces of the substrate. Beside the substrate, the optical module comprises an optical means for coupling light waves into said substrate by internal reflection. In the example of FIG. 26, this optical means is a prism 174 wherein one of its surfaces 176 is located next to the said slanted edge 172 of the substrate. The prism also comprises two additional polished surfaces, 178 and 180. An optical ray 182 enters the prism 174 through the surface 180, is reflected by total internal reflection off surface 176, then reflected off surface 178. It then enters the substrate 20 through the edge 172. The ray 182 is then trapped inside the substrate 20 by total internal reflection. It is then coupled out of the substrate by reflection off the reflecting surfaces 22.

FIG. 27 illustrates an embodiment of the present invention, in which the LOE 20 is embedded in an eyeglass frame 188. The display source 4, the collimating lens, and the folding element 190 are assembled inside the arm portions 192 of the eyeglass frames, next to the edge of the LOE 20. For a case in which the display source is an electronic element, such as a small CRT, LCD or OLED, the driving electronics 194 for the display source might be assembled inside the back portion of the arm 192. A power supply and data interface 196 can be connected to arm 192 by a lead 198 or any other communication means, including radio or optical transmission. Alternatively, a battery and miniature data link electronics can be integrated into the eyeglass frames.

The embodiment described above can serve in both see-through and non-see-through systems. In the latter case, opaque layers are located in front of the LOE. It is not necessary to occlude the entire LOE, just the active area, where the display is visible. In this way, the device maintains peripheral vision for the user, replicating the viewing experience of a computer or a television screen, in which such peripheral vision serves an important cognitive function. Alternatively, a variable filter can be placed in front of the system in such a way that the viewer can control the level of brightness of the light waves emerging from the external scene. This variable filter could either be a mechanically controlled device, such as a folding filter or two rotating polarizers, an electronically controlled device, or even an automatic device whereby the transmittance of the filter is determined by the brightness of the external background.

There are some alternatives as to the precise way in which an LOE can be utilized in this embodiment. The simplest option is to use a single element for one eye. Another option is to use an element and a display source for each eye, projecting the same image. Alternatively it is possible to project two different parts of the same image, with some overlap between the two eyes, enabling a wider FOV. Yet another possibility is to project two different scenes, one to each eye, in order to create a stereoscopic image. With this alternative, attractive implementations are possible, including 3-dimensional movies, advanced virtual reality, training systems and others.

FIG. 28 illustrates a modified version of the embodiment described in FIG. 27. In addition to the components which are embedded in the eyeglass frames, a miniature video camera 200 with optional optical zoom capability is installed in the front region of the frame 192. The camera captures images from the external scene, transfers the video signal to an image processing unit 202, which can be installed inside the electronics unit 194 and which can be controlled in real-time by the user. The processed image signal is then transferred to the image source 4, which projects the image through the LOE 20 into the eye of the user.

The embodiment of FIG. 28 can be implemented in a wide variety of applications. A possible utilization is for users who require an ability to perform close-up views on distant objects. Here the user can set the zoom position of the video camera according to the desired magnification. The captured image can then be processed and projected by the optical system. Another application can combine a thermal camera or a miniature star-light-amplifier (SLA) to materialize a night-vision goggle device. Here, the image from the external scene can be recorded, even in bad lighting conditions, and translated by the processing unit 202 to a conventional video image which can be seen easily by the user.

Another potential application of the embodiment illustrated in FIG. 28 is a visual aid for people who suffer from age-related macular degeneration (AMD). AMD is a progressive eye condition affecting many millions people around the world. The disease attacks the macula of the eye, where the sharpest central vision occurs. Although it rarely results in complete blindness, it destroys the clear, "straight ahead" central vision necessary for reading, driving, identifying faces, watching television, doing fine detailed work, safely navigating stairs and performing other daily tasks that are usually taken for granted, leaving only dim images or black holes at the center of vision. It can also dim contrast sensitivity and color perception. Peripheral vision may not be affected, and it is possible to see "out of the corner of the eye."

Presently, there are some products in the market to assist with low vision. One of the more popular devices is the spectacle-mounted magnifiers which exploit the undamaged peripheral vision of a patient enabling functioning as normally as possible. Spectacle-mounted telescopes for distance, or spectacle-mounted microscopes for close-up, can significantly improve visual capabilities. These devices protrude from the spectacle frame, and can be used with one or both eyes and can magnify between 2 to 10 times, depending on the size of the telescope. As the desired magnification of the system increases, these devices become larger, heavier and bulkier, and therefore, even for moderate performance, are impractical. This is a major drawback for all kinds of displays but especially in head-mounted applications and even more so for elderly users, wherein the system must necessarily be as light and as compact as possible. Another disadvantage is the "unsocial appearance" of the device, resulting from its strange shape and large dimensions. In addition, the functionality with this device can sometimes be very complicated. For instance, when using spectacle-mounted microscopes, objects must be held much closer to the eyes than normal. Since the embodiment described in FIG. 28 can be as compact and light as conventional spectacles, with the same "natural look", this device can be a good candidate for use as an effective user-friendly low vision aid for people who suffer from AMD. The user can control the zoom of the optical system to achieve the required optical magnification easily, in accordance with his medical conditions and with the external scene. Moreover, this type of spectacles reflects the functionality of bifocals in that they allow a person to switch to the required zoom operation for improved distance vision, and back to the conventional spectacle lens for general orientation, with the additional advantage that this zoom is dynamic and continuous.

The embodiments of FIGS. 27 and 28 are just examples illustrating the simple implementation of the present invention. Since the substrate-guided optical element, constituting the core of the system, is very compact and lightweight, it could be installed in a vast variety of arrangements. Hence, many other embodiments are also possible, including a visor, a folding display, a monocle, and many more. This embodiment is designated for applications where the display should be near-to-eye; head-mounted, head-worn or head-carried. There are, however, applications where the display is located differently. An example of such an application is a hand-held device for mobile application, such as for example a cellular phone. These devices are expected to perform novel operations in the near future, which require the resolution of a large screen, including videophone, internet connection, access to electronic mail, and even the transmission of high-quality television satellite broadcasting. With the existing technologies, a small display could be embedded inside the phone, however, at present, such a display can project either video data of poor quality only, or a few lines of Internet or e-mail data directly into the eye.

FIG. 29 illustrates an alternative method, based on the present invention, which eliminates the current necessary compromise between the small size of mobile devices and the desire to view digital content on a full format display. This application is a hand-held display (HHD), which resolves the previously opposing requirements of achieving small mobile devices, and the desire to view digital content on a full format display, by projecting high quality images directly into the eye of the user. An optical module including the display source 4, a first display source, the folding and collimating optics 190 and the substrate 20 is integrated into the body of a cellular phone 210, where the substrate 20 replaces the existing protective cover-window of the phone. Specifically, the volume of the support components, including the first display source 4 and optics 190, is sufficiently small to fit inside the acceptable volume for modem cellular devices. In order to view the full screen, transmitted by the device, the window of the device is positioned in front of the user's eye 24, observing the image with high FOV, a large eye-motion-box and a comfortable eye-relief. It is also possible to view the entire FOV at a larger eye-relief by tilting the device to display different portions of the image. Furthermore, since the optical module can operate in see-through configuration, a dual operation of the device is possible; namely there is an option to maintain the conventional cellular display 212, a second display source, intact. In this manner, the standard, low-resolution display can be viewed through the LOE 20 when the first display source 4 is shut-off. In a second, virtual-mode, designated for e-mail reading, internet surfing, or video operation, the conventional second display source 212 is shut-off, while the first display source 4 projects the required wide FOV image into the eye of the viewer through the LOE 20. The embodiment described in FIG. 29 is only an example, illustrating that applications other than head-mounted displays can be materialized. Other possible hand-carried arrangements include palm computers, compact entertainment devices like the iPod, small displays embedded into wristwatches, a pocket-carried display having the size and weight reminiscent of a credit card, and many more. Alternatively, instead of integrating the LOE inside the HHD as illustrated in FIG. 29, it is clearly possible to fabricate a separate viewing device, as illustrated in FIGS. 27 and 28 and connecting it into a conventional HHD. The viewing devices illustrated in FIGS. 27 to 29 can be materialized not only by utilized LOE having anisotropic reflecting surfaces but also by other types of LOEs, wherein all the partially reflective surfaces are exploiting isotropic angular sensitive thin film coatings.

The embodiments described above are mono-ocular optical systems, that is, the image is projected onto a single eye. There are, however, applications, such as head-up displays (HUD), wherein it is desired to project an image onto both eyes. Until recently, HUD systems have been used mainly in advanced combat and civilian aircraft. There have been numerous proposals and designs, of late, to install a HUD in front of a car driver in order to assist in driving navigation or to project a thermal image into his eyes during low-visibility conditions. Current aerospace HUD systems are very expensive, the price of a single unit being of the order of hundreds of thousands of dollars. In addition, the existing systems are very large, heavy, and bulky, and are too cumbersome for installation in a small aircraft let alone a car. LOE-based HUDs potentially provide the realization of a very compact, self-contained HUD, that can be readily installed into confined spaces. It also simplifies the construction and manufacturing of the optical systems related to the HUD and as such, could be suitable for improving on aerospace HUDs, as well as introducing a compact, inexpensive, consumer version for the automotive industry.

FIG. 30 illustrates a method of materializing an HUD system based on the present invention. The light waves from a display source 4 are collimated by a lens 6 to infinity and coupled by the first reflecting surface 16 into substrate 20. After reflection at a second reflecting array (not shown), the optical light waves impinge on a third set of reflecting surfaces 22, which couple the light waves out into the eyes 24 of the viewer. The overall system can be very compact and lightweight, of the size of a large postcard having a thickness of a few millimeters. The display source, having a volume of a few cubic centimeters, can be attached to one of the corners of the substrate, where an electrical cord can transmit the power and data to the system. It is expected that the installation of the presented HUD system will be no more complicated than the installation of a simple commercial audio system. Moreover, since there is no need for an external display source for image projection, the necessity to install components in unsafe places is avoided.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method for fabricating an optical device including at least one partially reflecting surface and a light-wave transmitting substrate that allows light-waves to traverse the light-wave transmitting substrate between external surfaces of the light-wave transmitting substrate, the method comprising:
    obtaining a plurality of substantially transparent plates, each of the transparent plates having an associated thickness, and wherein the thickness of two of the transparent plates is increased relative to the thickness of all remaining transparent plates of the plurality transparent plates;
    coating at least one surface of at least one of the transparent plates, other than the two transparent plates having increased thickness, with a partially reflecting coating to form the at least one partially reflecting surface;
    stacking the plates in a stack such that the two transparent plates having increased thickness are at opposite ends of the stack, and attaching the stacked plates to each other;
    slicing the stacked plates to form the light-wave transmitting substrate such that the light-wave transmitting substrate includes at least a first and a second major external surface;
    grinding or polishing the light-wave transmitting substrate; and
    coating at least one of the first or second major external surfaces with a coating to compensate for non-uniformity of the light-wave transmitting substrate.

2. The method of claim 1, wherein the slicing the stacked plates includes:
    cutting the stacked plates along two parallel planes, and
    cutting the stacked plates along at least one plane obliquely angled to the two parallel planes, such that the first and second major external surfaces are parallel to each other and the light-wave transmitting substrate further includes at least one slanted edge at an oblique angle with respect to the first and second major external surfaces.

3. The method of claim 1, further comprising: attaching a blank plate to one of the first or second major external surfaces.

4. The method of claim 1, further comprising: attaching an optical element to the light-wave transmitting substrate for coupling light waves into the light-wave transmitting substrate by total internal reflection between the first and second major external surfaces.

5. The method of claim 4, wherein the first and second major external surfaces are parallel to each other and wherein the light-wave transmitting substrate includes at least one slanted edge at an oblique angle with respect to the first and second major external surfaces, and wherein the optical element is attached to the light-wave transmitting substrate at the at least one slanted edge.

6. The method of claim 1, wherein the at least one partially reflecting surface is carried by the light-wave transmitting substrate.

7. The method of claim 1, wherein the coating at least one surface of the at least one of the transparent plates includes applying the partially reflecting coating to a first and a second major surface of the at least one of the plates.

8. The method of claim 1, wherein the at least one partially reflecting surface is formed from at least one plate that is separate from the plurality of plates.

9. The method of claim 8, wherein the at least one plate that is separate from the plurality of plates is formed from an angular sensitive thin film.

10. The method of claim 1, wherein the at least one partially reflecting surface includes a plurality of partially reflecting surfaces, and wherein at least two of the partially reflecting surfaces have different reflectivity.

11. The method of claim 10, wherein the non-uniformity of the light-wave transmitting substrate is caused by the different reflectivity of the at least two of the partially reflecting surfaces.

12. The method of claim 1, further comprising: coating at least one surface of at least one of the transparent plates with a polarization sensitive coating.

13. The method of claim 1, wherein the thickness of the transparent plates that are coated with the partially reflecting coating is decreased relative to the thickness of all remaining transparent plates of the plurality transparent plates.

14. A method for fabricating an optical device including a plurality of partially reflecting surfaces and a light-wave transmitting substrate that allows light-waves to traverse the light-wave transmitting substrate between external surfaces of the light-wave transmitting substrate, the method comprising:

obtaining a plurality of substantially transparent plates, each of the transparent plates having an associated thickness;

coating at least one surface of a subset of the transparent plates with a partially reflecting coating to form a plurality of partially reflecting surfaces, wherein the thickness of the transparent plates in the subset is decreased relative to the thickness of all remaining transparent plates of the plurality transparent plates;

stacking the plates in a stack such that the plurality of partially reflecting surfaces is interleaved with the transparent plates which are not coated with the partially reflecting coating, wherein the thickness of two of the transparent plates which are not coated with the partially reflecting coating is increased relative to the thickness of all remaining transparent plates of the plurality transparent plates and wherein the two of the transparent plates having increased thickness are at opposite ends of the stack;

attaching the stacked plates to each other;

slicing the stacked plates to form the light-wave transmitting substrate such that the light-wave transmitting substrate includes at least a first and a second major external surface;

grinding or polishing the light-wave transmitting substrate; and coating at least one of the first or second major external surfaces with a coating to compensate for non-uniformity of the light-wave transmitting substrate.

\* \* \* \* \*